US012426625B2

(12) United States Patent
Hoch et al.

(10) Patent No.: US 12,426,625 B2
(45) Date of Patent: Sep. 30, 2025

(54) HEATING APPARATUS

(71) Applicant: Hoch Brands LLC, Boca Raton, FL (US)

(72) Inventors: Bruce A. Hoch, Boca Raton, FL (US); Charles V. Hoch, Boca Raton, FL (US)

( * ) Notice: Subject to any disclaimer, the term of this patent is extended or adjusted under 35 U.S.C. 154(b) by 507 days.

(21) Appl. No.: 17/702,367

(22) Filed: Mar. 23, 2022

(65) Prior Publication Data

US 2022/0304392 A1 Sep. 29, 2022

Related U.S. Application Data

(60) Provisional application No. 63/165,269, filed on Mar. 24, 2021.

(51) Int. Cl.

| | |
|---|---|
| ***A24F 1/30*** | (2006.01) |
| ***A24F 40/46*** | (2020.01) |
| ***A24F 40/57*** | (2020.01) |
| ***A24F 40/60*** | (2020.01) |
| ***A24F 40/85*** | (2020.01) |
| ***H05B 3/06*** | (2006.01) |
| *H01R 13/627* | (2006.01) |
| *H01R 33/06* | (2006.01) |

(52) U.S. Cl.

CPC ................ *A24F 1/30* (2013.01); *A24F 40/46* (2020.01); *A24F 40/57* (2020.01); *A24F 40/60* (2020.01); *A24F 40/85* (2020.01); *H05B 3/06* (2013.01); *H01R 13/6272* (2013.01); *H01R 33/06* (2013.01)

(58) Field of Classification Search

None

See application file for complete search history.

(56) References Cited

U.S. PATENT DOCUMENTS

2015/0257443 A1* 9/2015 Rado ........................ A24F 42/10 392/390
2017/0055579 A1* 3/2017 Kuna ........................ A24F 1/00
2017/0079324 A1* 3/2017 Eksouzian .............. A24F 40/42

(Continued)

FOREIGN PATENT DOCUMENTS

CN 204306045 U 5/2015
WO 2017205692 A1 11/2017

OTHER PUBLICATIONS

Nugular, Screen Capture from You Tube video entitled "How to: Use an Enail", www.Youtube.com, 2017. Accessed via: https://www.youtube.com/watch?v=lxrEb_vmy6c (Year: 2017).*

(Continued)

*Primary Examiner* — Manley L Cummins, IV

(74) *Attorney, Agent, or Firm* — Dorsey & Whitney LLP

(57) ABSTRACT

Disclosed herein are examples of a heating apparatus. In some embodiments, the heating apparatus is a battery powered heating apparatus suitable for burning or vaporizing a vaporizable material, such as an oil, wax, or liquid that when vaporized may be inhaled by a user. The heating apparatus includes a deployable element including a resistive element. In some embodiments, the heating apparatus has variable heat settings for the resistive element, controllable by the user through a user input (e.g., a button). In some embodiments, an indicator provides output communication to the user. The heating apparatus may include a power supply such as a rechargeable battery to supply power to the resistive element.

22 Claims, 22 Drawing Sheets

(56) References Cited

U.S. PATENT DOCUMENTS

| | | | | |
|---|---|---|---|---|
| 2019/0307171 | A1* | 10/2019 | Kane | H05B 3/46 |
| 2020/0236998 | A1* | 7/2020 | Batista | H05B 6/108 |
| 2021/0084967 | A1* | 3/2021 | Huang | A24F 1/16 |
| 2021/0212382 | A1* | 7/2021 | Fuisz | A24F 40/57 |
| 2022/0046989 | A1* | 2/2022 | Liu | H05B 3/06 |
| 2022/0401665 | A1 | 12/2022 | Smith et al. | |

OTHER PUBLICATIONS

MiniNail, Screen Capture from You Tube video entitled "MiniNail eNail Review-Sneaky Pete", www.Youtube.com, 2021. Accessed via: https://www.youtube.com/watch?v=QxrZVBfKi6U (Year: 2021).*

All products listings from e-nail.com, 18 pages, retrieved on Dec. 22, 2022, believed available before the priority date, retrieved from https://e-nail.com/.

Product results for E-RIGS & E-NAILS, retrieved on Dec. 22, 2022, believed available before the priority date, 9 pages, Hemper, retrieved from https://www.hemper.co/collections/e-nail.

"Dipper Vaporizer", Product Listing, retrieved on Dec. 22, 2022, believed available before the priority date, 5 pages, Dip Devices, retrieved from https://dipdevices.com/collections/dipper/products/dipper-vaporizer.

"E-Nail", Glossary result, 3 pages, retrieved on Dec. 22, 2022, believed available before the priority date, Leafly Holdings, Inc., retrieved from https://www.leafly.com/learn/cannabis-glossary/e-nail.

"G Pen Connect Review", Product review, 8 pages, Aug. 7, 2022, The Vape Guide, retrieved from https://thevape.guide/reviews/g-pen-connect-review/.

"G Pen Connect Vaporizer", Product listing, retrieved on Dec. 22, 2022, G-Pen, believed available before the priority date, retrieved from https://www.gpen.com/products/g-pen-connect#:~:text=The%20G%20Pen%20Connect%20is,a%20torch%20and%20exposed%20nail.

"How To Use Stealth Hot Knife Electric Dab Tool", Vlog Post, 2013, link to video, retrieved from https://vimeo.com/89159213.

"Hyer Big-E Rig—eNail Vaporizer", Product listing, 7 pages, retrieved on Dec. 22, 2022, believed available before the priority date, CaliConnected, retrieved from https://caliconnected.com/products/hyer-big-e-rig.

"Plasma lighter", Product Search Results, 10 pages, retrieved on Dec. 22, 2022, believed available before the priority date, retrieved from https://www.amazon.com/plasma-lighter/s?k=plasma+lighter.

"ROOR®—Glass Wand Lighter", Product Listing, 4 pages, retrieved on Dec. 22, 2022, believed available before the priority date, Aqua Lab Technologies, retrieved from https://aqualabtechnologies.com/products/roor-glass-glass-wand-lighter.

"Twist Hot Knife—320 MAh Electric Dab Tool Kit—Panther Black", Product Listing, retrieved on Dec. 22, 2022, believed available before the priority date, 17 pages, Ooze, retrieved from https://www.oozelife.com/collections/hot-knife/products/ooz-1195-blk-tools-accessories-twist-hot-knife-panther-black.

"Vestratto Anvil Portable Vaporizer", Product listing, Nov. 29, 2021, 14 pages, Sneaky Pete Vaporizers, retrieved from https://www.sneakypetestore.com/blogs/vaporizer-reviews-user-guides/vestratto-anvil-first-look.

Lookah , "Lookah Seahorse Max Electric Nectar Collector Dab Pen", retrieved on Dec. 22, 2022, believed available before the priority date, Mind Vapes, retrieved from https://mindvapes.com/collections/electric-nectar-collectors/products/lookah-seahorse-max-dab-pen?variant=39924552761520.

Oozelife Vaporizers , "Oozelife Vaporizers—Pronto Electric Nectar Collector", Product Listing, 5 pages, retrieved on Dec. 22, 2022, believed available before the priority date, Mind Vapes, retrieved from https://mindvapes.com/collections/electric-nectar-collectors/products/ooze-pronto-electric-nectar-collector?variant=43779223322853.

Pyrah, Andrew , "Smoking a Bong with a Glass Rod", YouTube video, 2013, retrieved from https://www.youtube.com/watch?v=4M0mhOYUtuk.

The Sanctuary Editorial Team , "How to Use a Dab Straw", blog post, 11 pages, Jun. 9, 2022, The Sanctuary, retrieved from https://thesanctuarynv.com/how-to-use-a-dab-straw/.

"Iso-Tip Power Pro Advanced Cordless Soldering Iron Kit—Model 8000," Iso-Tip, a Division of Senasys, obtained June 13, 2024 from <https://iso-tip.com/product/iso-tip-power-pro-advanced-cordless-soldering-iron-kit-model-8000>, 7 pages.

* cited by examiner

HEATING APPARATUS

CROSS REFERENCE TO RELATED APPLICATIONS

This application claims the benefit of priority pursuant to 35 U.S.C. § 119(e) of U.S. provisional patent application No. 63/165,269, filed 24 Mar. 2021, entitled "Heating Apparatus," which is hereby incorporated by reference herein in its entirety.

FIELD

This disclosure generally relates to heating devices with a power supply and a removable element and related methods.

BACKGROUND

Traditional devices used for smoking or vaporizing a vaporizable substance, such as dab rigs or bongs, include a container (also known as a banger) that receives the vaporizable substance. The container is open at one end and in fluid communication with one end of a conduit (e.g., down stem). A lid (e.g., a carb cap) may be placed on the banger. The carb cap may include an aperture suitable for drawing air into the banger. An opposite end of the down stem is received in a body of the smoking apparatus. The down stem may include a percolator or diffusion opening at the end received in the body. The percolator may be disposed near a lower end of the body. At an upper end of the body, a conduit including a mouthpiece is usually placed in fluid communication with the body. Dab rigs are usually made of glass or ceramic to withstand the high temperatures to which the banger may be heated.

In using such traditional devices, the body may be partially filled with a liquid such as water, such that the liquid level is above the percolator. The banger is heated, usually with an open flame torch (e.g., butane). When the banger is sufficiently heated, a vaporizable material (e.g., oil or wax) is placed in the banger and begins to vaporize or burn. A user may place a carb cap on the banger. The user may place their mouth on the mouthpiece to draw air in through the aperture in the carb cap and into the banger. The air may flow along with the now vaporized vaporizable material from the banger into the conduit, through the conduit out of the percolator and through the liquid. The liquid may cool and/or mellow the vaporized material to make it more palatable or consumable. The vaporized material may then be drawn by the user's inhaled breath through the mouthpiece into the user's lungs.

While traditional dab rigs are effective delivery devices for the vaporizable material, the available devices for heating the banger are lacking. The banger is typically heated with an open butane flame that can reach adiabatic flame temperatures of up to 3578° F. Many vaporizable materials vaporize at temperatures of between about 302° F. and 428° F. Some high temperature vaporizable materials may vaporize at temperatures of up to about 900° F. Yet, all of these temperatures are well below the temperature of a butane flame. Vaporizing materials at temperatures that are higher than needed can be harsher and sacrifice flavor relative to lower temperatures. When temperatures are too high (e.g., above about 900° F., certain carcinogens or other toxins may be formed.

Heating a banger with an open flame is an imprecise practice. The temperature is not easily controlled in terms of where the heat is placed. A user has no way to tell how hot the banger is nor how consistently it is heated. The temperature may be too high (resulting in the formation of toxins or lost flavor) or too low, resulting in lower utilization of the vaporizable material. Further, it may be difficult to consistently use the dab rig, as the heating may be different with every use. Using an open flame also presents a number of issues including wasted energy and possibly overheating of the whole banger when only a portion of it actually contacts and vaporizes the vaporizable material and the risk of burns from the flame directly or from overheated glass. Improved solutions for heating a vaporizable material are desired.

BRIEF SUMMARY

A heating apparatus is disclosed. In one embodiment the main body includes a retaining mechanism, and a power supply. The heating apparatus includes a deployable element selectively removable from the main body. The deployable element includes a heating element including a shaft portion, a cover including an aperture. The cover is selectively receivable on the shaft portion by the aperture. The deployable element includes a resistive element, a cap disposed on a first end of the shaft portion and enclosing the resistive element. A physical interface is disposed on a second end of the shaft portion opposite the first end. The physical interface is configured to be selectively retained by the retaining mechanism. An electrical interface is in selective electrical communication with the main body. When the physical interface is retained by the retaining mechanism, the electrical interface is in electrical communication with the main body and operative to receive electrical power from the power supply and provide the electrical power to the resistive element.

An embodiment of a heating apparatus includes a main body including: a retaining mechanism, and a power distribution element. The heating apparatus includes a deployable element operably connected with the power distribution element and selectively removable from the main body by actuation of the retaining mechanism. The deployable element includes a heating element in electrical communication with the power distribution element and is selectively disconnectable from the power distribution element in conjunction with the removal of the deployable element from the main body, and a cover portion movable relative to the heating element. The heating element selectively attains a temperature sufficient to vaporize a vaporizable material positioned in a container of a smoking apparatus.

In one embodiment, a heating apparatus is disclosed including a main body. The main body includes a retaining mechanism, and a power supply. The heating apparatus includes a deployable element selectively removable from the main body. The deployable element includes a heating element with a shaft portion, a cover including an aperture. The cover is selectively receivable on the shaft portion through the aperture, a resistive element, a cap disposed on a first end of the shaft portion and enclosing the resistive element. A physical interface portion is disposed on a second end of the shaft portion opposite the first end. The physical interface portion is configured to be selectively retained by the retaining mechanism, an electrical interface feature in selective electrical communication with the main body. The physical interface portion is retained by the retaining mechanism, the electrical interface feature is in electrical communication with the main body and operative to receive electrical power from the power supply to provide the electrical power to the resistive element.

Optionally in some embodiments, the resistive element is retained in the shaft portion by a plug including a heat barrier that concentrates heat from the resistive element to a focus region on the cap.

Optionally in some embodiments, the main body further includes: a processing element; a user input operative to receive a command from a user; and an indicator operative to indicate a status to the user.

Optionally in some embodiments, the processing element is operative to cause the resistive element to repeatedly heat and cool to clean the deployable element.

Optionally in some embodiments, the main body further includes: a first receptacle operative to: receive external electrical power from an external power supply; and provide power to the power supply or the resistive element.

Optionally in some embodiments, the first receptacle is operative to provide power to the power supply and the resistive element at the least partially contemporaneously.

Optionally in some embodiments, the shaft portion is sized to be received in a container of a smoking apparatus to vaporize a vaporizable material.

Optionally in some embodiments, the cover positioned over an opening in the container and at least partially forms a seal with the container. The aperture is sized to allow a user to inhale air through the smoking apparatus when the cover seals the container.

Optionally in some embodiments, the user input is operative to select a temperature setting for the resistive element comprising at least one of 475° F., 575° F., 675° F., or 750° F.

Optionally in some embodiments, the resistive element is integral with the cap.

Optionally in some embodiments, the resistive element is a ceramic resistive element.

Optionally in some embodiments, the power supply includes a rechargeable battery.

Optionally in some embodiments, the retaining mechanism includes: a carriage body with a rim forming a second aperture in the carriage body; a pawl extending inwardly from the rim into the second aperture; and a biasing element that biases the pawl into a latched position with the physical interface to retain the deployable element with the main body.

Optionally in some embodiments, the deployable element includes an energy storage element configured to supply at least a portion of the electrical power to the resistive element when the deployable element is deployed from the main body.

Optionally in some embodiments, the energy storage element comprises a capacitive element.

Optionally in some embodiments, the deployable element includes an internal compartment configured to receive a vaporizable material.

Optionally in some embodiments, the shaft portion includes a removable portion including the resistive element.

In one embodiment, a heating apparatus including: a main body including: a retaining mechanism, and a power distribution element; a deployable element operably connected with the power distribution element and selectively removable from the main body by actuation of the retaining mechanism. The deployable element includes a heating element in electrical communication with the power distribution element and selectively disconnectable from the power distribution element in conjunction with the removal of the deployable element from the main body, and a cover portion movable relative to the heating element. The heating element selectively attains a temperature sufficient to vaporize a vaporizable material positioned in a container of a smoking apparatus.

Optionally in some embodiments, the heating element includes: a shaft portion; a cover defining an aperture through which the shaft portion is movably received; a resistive element; a cap disposed on a first end of the shaft portion and enclosing the resistive element; a physical interface disposed on a second end of the shaft portion opposite the first end. The physical interface is configured to be selectively retained by the retaining mechanism; and an electrical interface in selective electrical communication with the main body. The physical interface is retained by the retaining mechanism, the electrical interface is in electrical communication with the main body and operative to receive electrical power from the power distribution element and provide the electrical power to the resistive element.

In one embodiment, a smoking apparatus is disclosed. The main body includes: a retaining mechanism, and a power supply; and a body portion. The body portion includes a head portion including a resistive element, a compartment configured to receive a vaporizable material, a physical interface configured to be selectively retained by the retaining mechanism; and an electrical interface in selective electrical communication with the main body. When the physical interface is retained by the retaining mechanism, the electrical interface is in electrical communication with the main body and operative to receive electrical power from the power supply and provide the electrical power to the resistive element.

DETAILED DESCRIPTION

Figure 1:
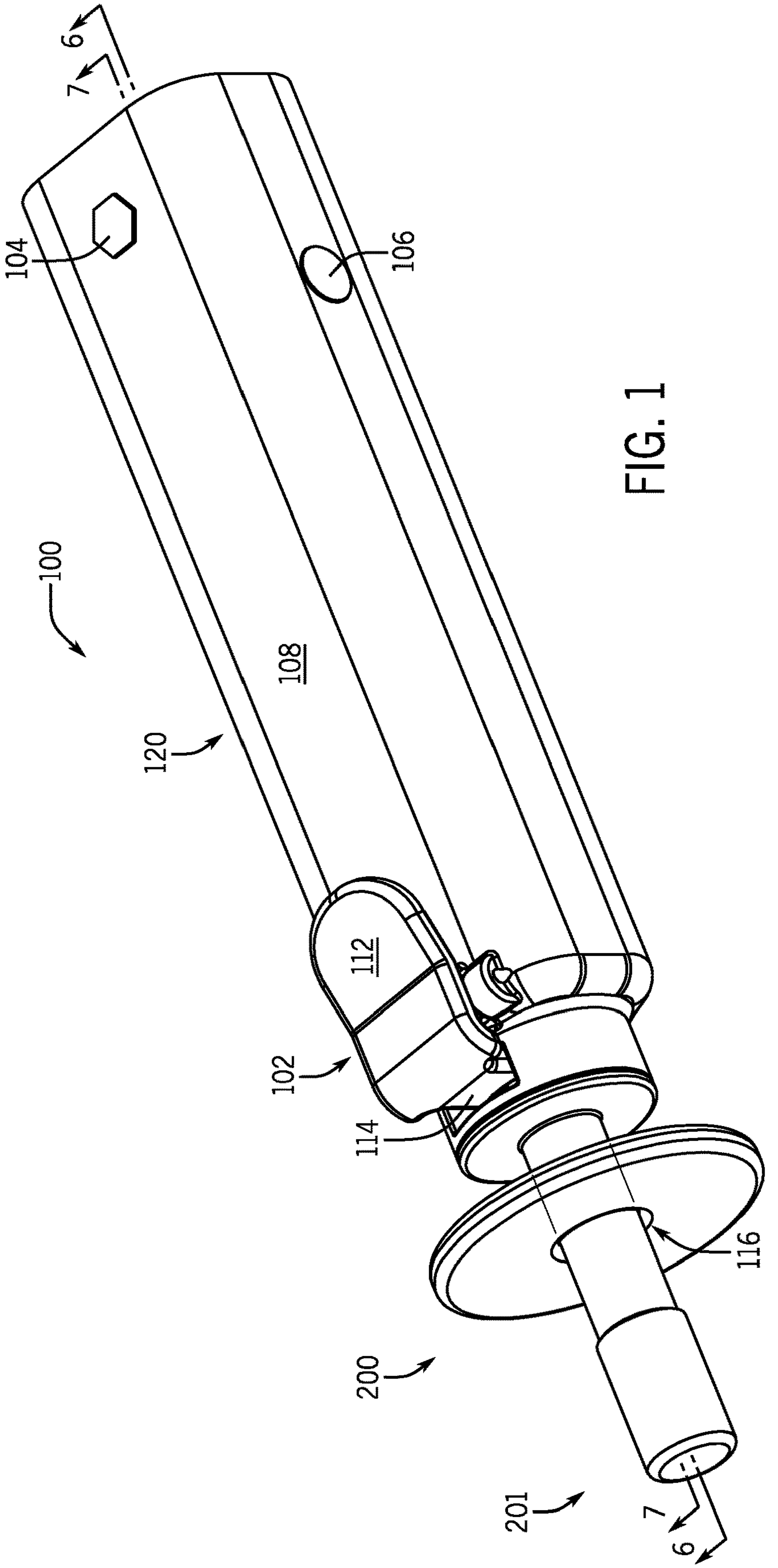
FIG. 1 is an isometric view of a heating element system.
Figure 2:
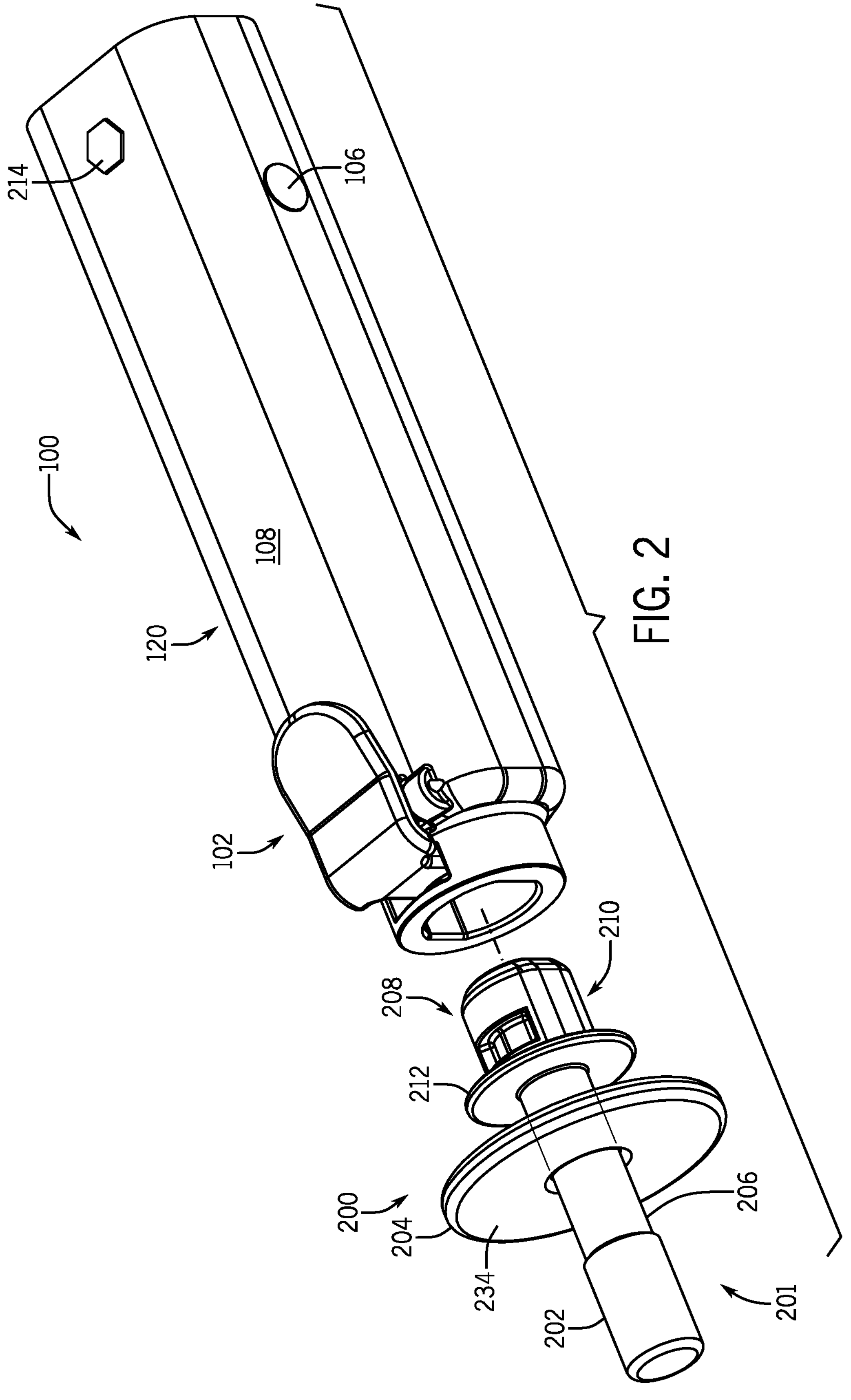
FIG. 2 is a partially exploded isometric view of the heating element system of FIG. 1.
Figure 3A:
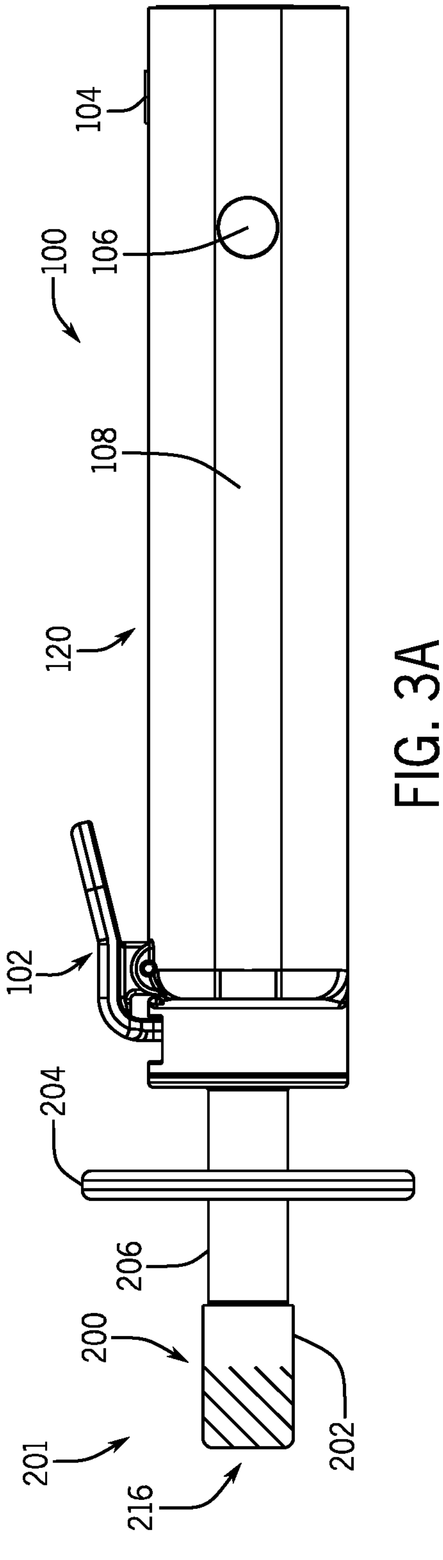
FIG. 3A is a side elevation view of the heating element system of FIG. 1.
Figure 3B:
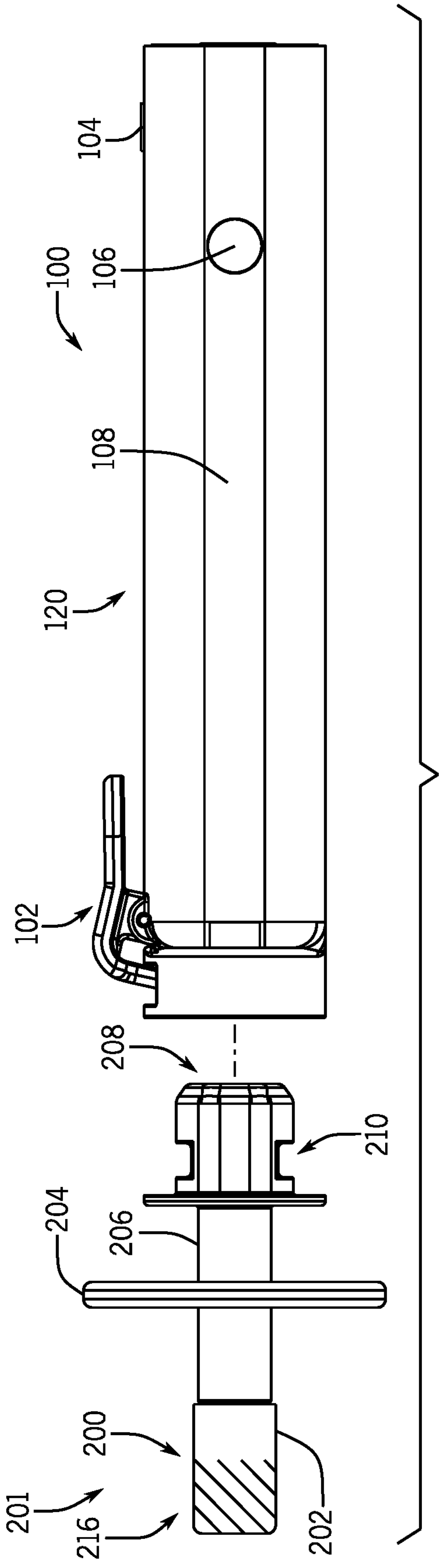
FIG. 3B is a partially exploded side elevation view of the heating element system of FIG. 1.

Disclosed herein are examples of a heating apparatus 100. In some embodiments, the heating apparatus 100 is a battery powered heating apparatus suitable for burning or vaporizing a vaporizable material, such as an oil, wax, or liquid that when vaporized may be inhaled by a user. The heating apparatus 100 includes a deployable element 200 with a heating element 201 including a resistive element 218. In some embodiments, the heating apparatus 100 may have variable heat settings for the resistive element 218, controllable by the user through a user input 106 (e.g., a button) operative to receive a command from a user. In some embodiments, an indicator 104 provides output communication to the user. The indicator 104 may be a light such as a light emitting diode (LED). In some embodiments, the indicator may be an audio device such as a speaker, buzzer, beeper, a haptic element, or a visual screen (e.g., an LCD or LED screen). In some embodiments, the indicator 104 may include more than one LED junction, such that the indicator 104 may emit different colors. For example, the indicator 104 may include red, green and blue light emitters that can be selectively activated to arrive at a number of different output colors, such as red, orange, yellow, amber, green, blue, violet, or other suitable colors. As shown in FIG. 1 and FIG. 2, in some embodiments, the deployable element 200 is selectively releasable from the main body 120. The main body 120 may include a casing 108 that houses internal components of the main body 120. The indicator 104 may extend through a portion of the casing 108, such as through an aperture formed therein. The user input 106, such as a button or switch, may be accessible on the casing 108. A retaining mechanism 102 may be provided on a portion of the casing 108 operative to selectively retain or release the deployable element 200 (see, e.g., FIG. 1 through FIG. 3B) from the main body 120. The deployable element 200 may include the resistive element 218, such as an electrical resistive element, suitable to be heated to an appropriate temperature for vaporizing a vaporizable material 808. The resistive element 218 may increase in temperature when an electric current passes there through. The main body 120 may include a power supply that supplies electrical power to the resistive element 218 to increase the temperature of at least a focus region 216 of the deployable element 200.

Figure 4:
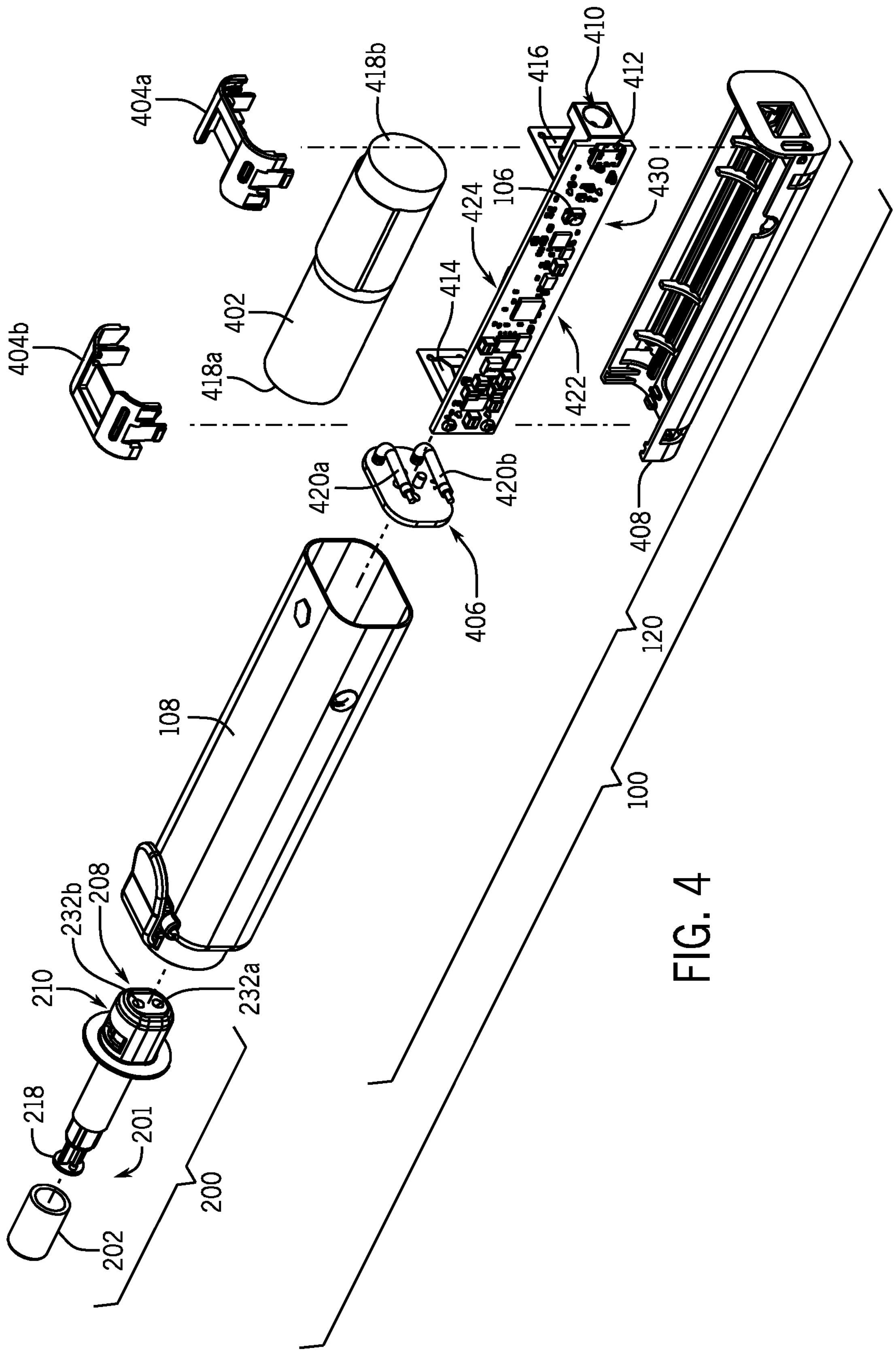
FIG. 4 is a rear exploded view of the heating element system of FIG. 1.
Figure 5A:
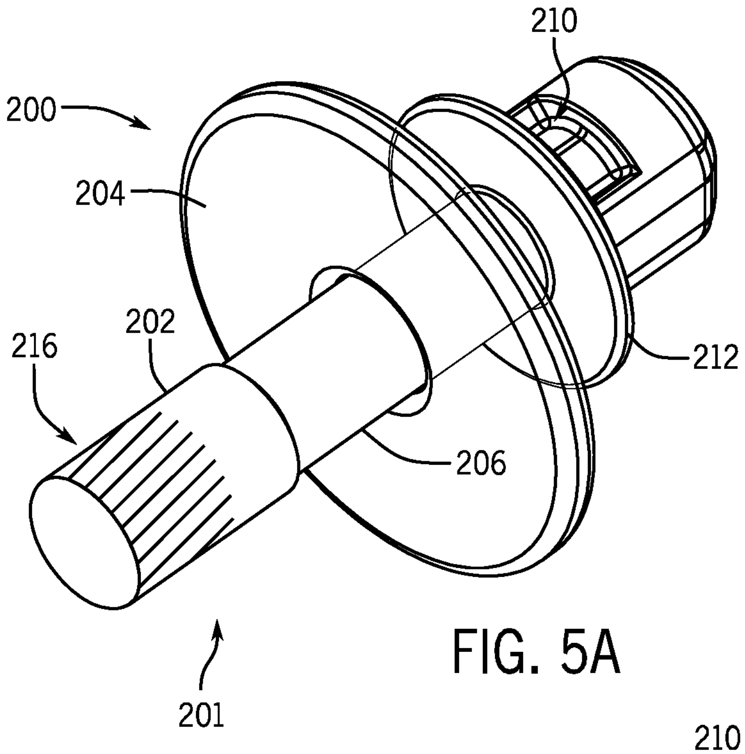
FIG. 5A is an isometric view of a deployable element of the heating element system of FIG. 1.
Figure 5B:
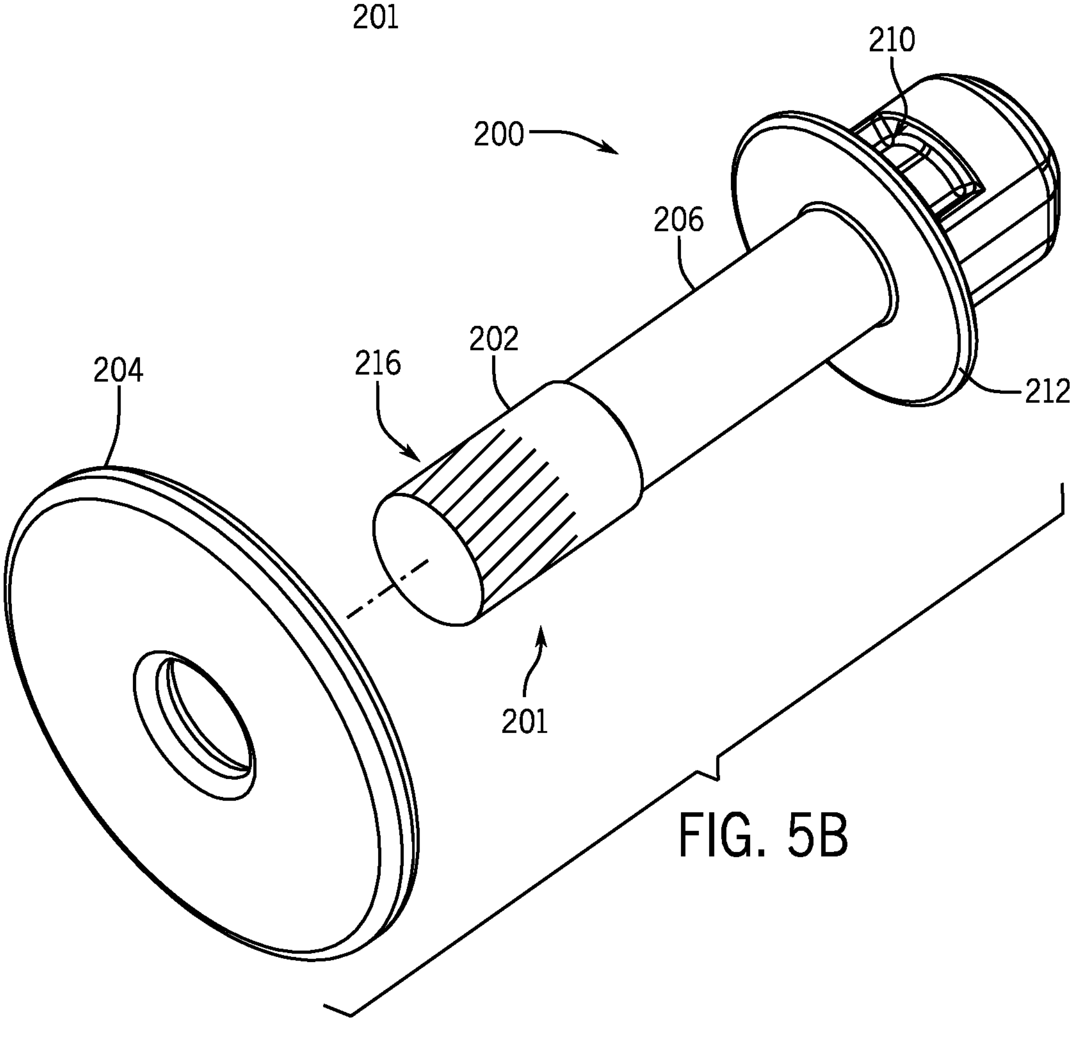
FIG. 5B is a partially exploded isometric view of the deployable element of FIG. 5A.

With reference to FIG. 4, the casing 108 of the main body 120 contains a control subsystem 424, a power supply 402, and a power distribution subsystem 406. The main body 120 may include an upper housing 404*a*, an upper housing 404*b*, and a lower housing 408. The upper housings 404*a/b* and lower housing 408 may support the power supply 402, the control subsystem 424, and/or the power distribution subsystem 406. The housings 404*a/b* and 408 may be received in the casing 108.

The control subsystem 424 may include one or more processing elements 422, one or more memory components 430, one or more power receptacles 410, 412, and indicator 104 and a user input 106. The various components may be in direct or indirect communication with one another, such as via one or more system buses, contract traces, wiring, or via wireless mechanisms.

The one or more processing elements 422 may be substantially any electronic device capable of processing, receiving, and/or transmitting instructions. For example, the processing elements 422 may be a microprocessor, microcomputer, graphics processing unit, field programmable gate array, or the like. It also should be noted that the processing elements 422 may include one or more processing elements 422 or modules that may or may not be in communication with one another. For example, a first processing element 422 may control a first set of components of the heating apparatus 100 and a second processing element 422 may control a second set of components of the heating apparatus 100 where the first and second processing elements 422 may or may not be in communication with each other. Relatedly, the processing elements 422 may be configured to execute one or more instructions in parallel.

The heating apparatus 100 may include an output interface. For example, the heating apparatus 100 may include an indicator 104 such as to display visual information (e.g., blinking, pulsing, flashing, or steady lights in one or more colors), audio information, and/or haptic information. In some embodiments, the output interface may include a screen or structure to display an output (e.g., images, graphical user interfaces, videos, notifications, and the like) to a user. In certain instances a screen may also act to receive user input (e.g., via a touch screen or the like). The screen may be an LCD screen, LED screen, an organic LED screen, or the like. The type and number of screens may vary.

Relatedly, the heating apparatus 100 may include a user input 106 that allows the heating apparatus 100 to receive input from a user. For example, the user input 106 may include a capacitive touch sensor, button (e.g., a momentary push button), switch, or the like.

The control subsystem 424 may include one or more memory components 430. The memory components 430 store electronic data that may be utilized by the control subsystem 424 to control the heating apparatus 100, such as programming instructions, audio files, video files, custom user settings, and the like. The memory components 430 may be, for example, non-volatile storage, a magnetic storage medium, optical storage medium, magneto-optical storage medium, read only memory, random access memory, erasable programmable memory, flash memory, or a combination of one or more types of memory components.

The control subsystem 424 may include a temperature sensor to detect if the temperature of a portion of the main body 120 (e.g., the power supply 402) exceeds an operational temperature threshold. The temperature sensor may be read by the processing element 422 and may trigger the indicator 104 to indicate to the user that the main body 120 is overheating. Temperature readings may feedback frequently enough to identify overheating during a heating cycle; additionally, a temperature reading of the battery may be taken prior to a heating cycle such that overheating may not occur in the middle of a heating cycle. In some examples, if the system triggers overheating, the amber LED may hold for 1 minute then turn off, communicating to the user that the device should be cooled before further use.

The control subsystem 424 may include one or more power receptacles, such as a power receptacle 410 and/or a power receptacle 412. The power receptacles 410/412 are operative to receive electrical power from an external source such as a wall plug, AC/DC adapter, battery, or the like. The power receptacles may 410/412 may supply electrical power to the power supply 402, to the processing element 422, the memory 430, and/or the resistive element 218 in the deployable element 200. In some embodiments, the power receptacles may supply power to the resistive element 218 (e.g., via the power distribution subsystem 406) while also supplying power to recharge the power supply 402 at the same time or at least partially contemporaneously (e.g., where the supply of external power to the resistive element 218 and to the power supply 402 from the external supply at least partially overlaps in time). The heating apparatus 100 may prioritize heating of the resistive element 218 and lighting of the indicator 104 as a higher priority over charging of the power supply 402. The power supply 402 may charge with excess available energy coming from the external power source via the power receptacle 410 and/or power receptacle 412. The power supply 402 may be prevented from overcharging by the processing element 422. The power receptacle 410 may be a pin and shell type DC electrical connector suitable to receive power from an external power source. The power receptacle 412 may be a USB-type power receptacle, such as a mini-USB, micro-USB, USB-C, or other type of connector. In some embodiments, the power receptacle 412 may be an Apple Lightning™ connector.

The power supply 402 provides power to various components of the heating apparatus 100. The power supply 402 may include one or more rechargeable (e.g., lithium ion, nickel metal hydride, nickel cadmium, lead acid, or other suitable types of rechargeable batteries) or disposable batteries (e.g., alkaline), or the like. The power supply 402 includes a terminal 418*a* and an oppositely charged terminal 418*b*. The terminals 418*a/b* may be in electrical communication with respective electrodes 414/416 of the control subsystem 424 to supply power to, or receive power from, the control subsystem 424. Additionally, the power supply 402 may include one or more types of connectors or components that provide different types of power to the control subsystem 424 and/or the resistive element 218.

The power supply 402 may be sized to meet ergonomic needs and industrial design of the heating apparatus 100. For example, the power supply 402 may be small and/or thin enough such that the casing 108 is sized to be comfortably held in a user's hand. In some embodiments, the power supply 402 can store enough energy to heat the resistive element 218, without being recharged, in excess of twenty cycles. For example, the power supply 402 may be able to supply power to fifty or more heating cycles.

Figure 6A:
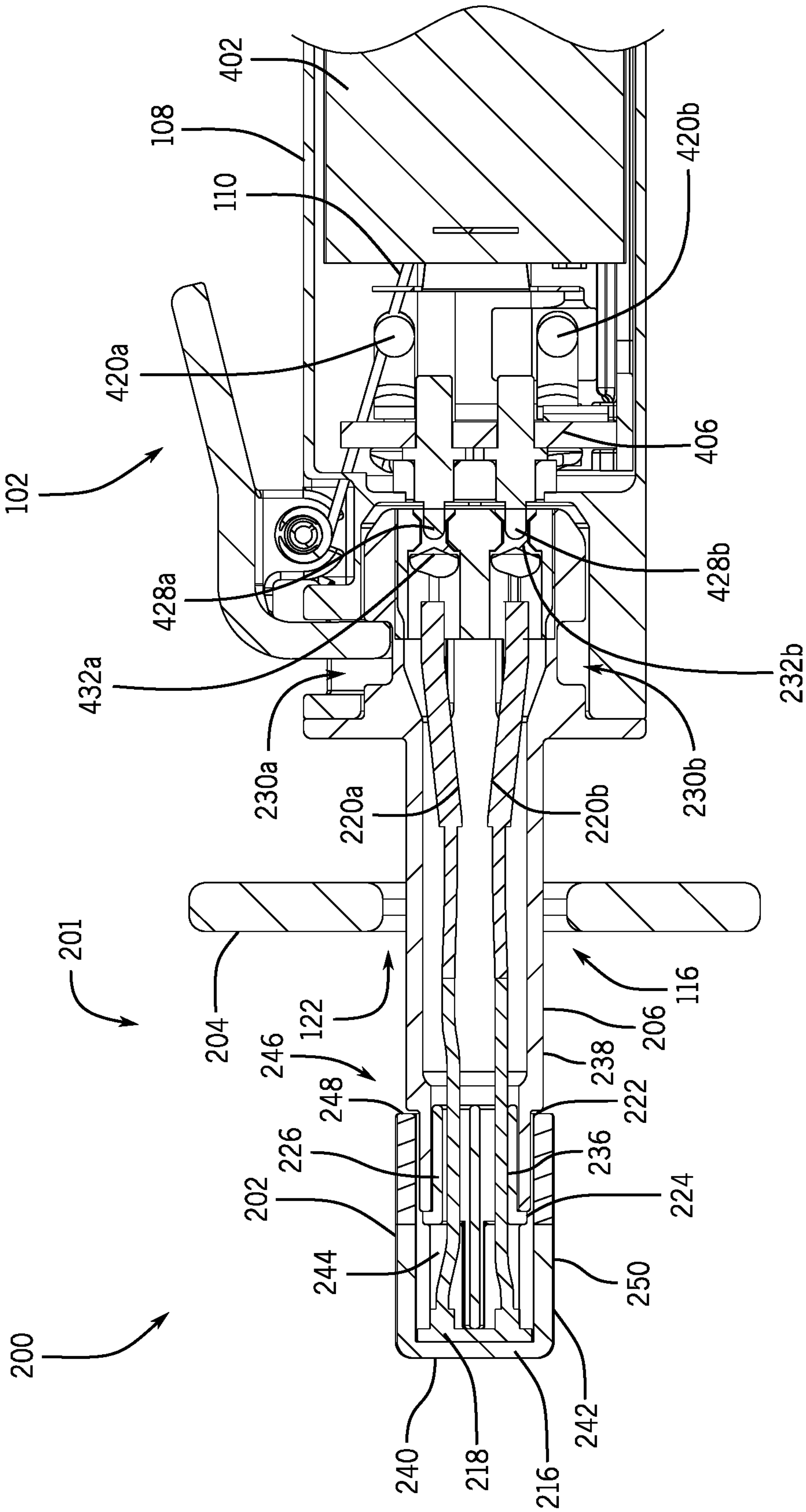
FIG. 6A is a partial section view of the heating element system of FIG. 1 taken along section line 6-6 of FIG. 1.
Figure 6B:
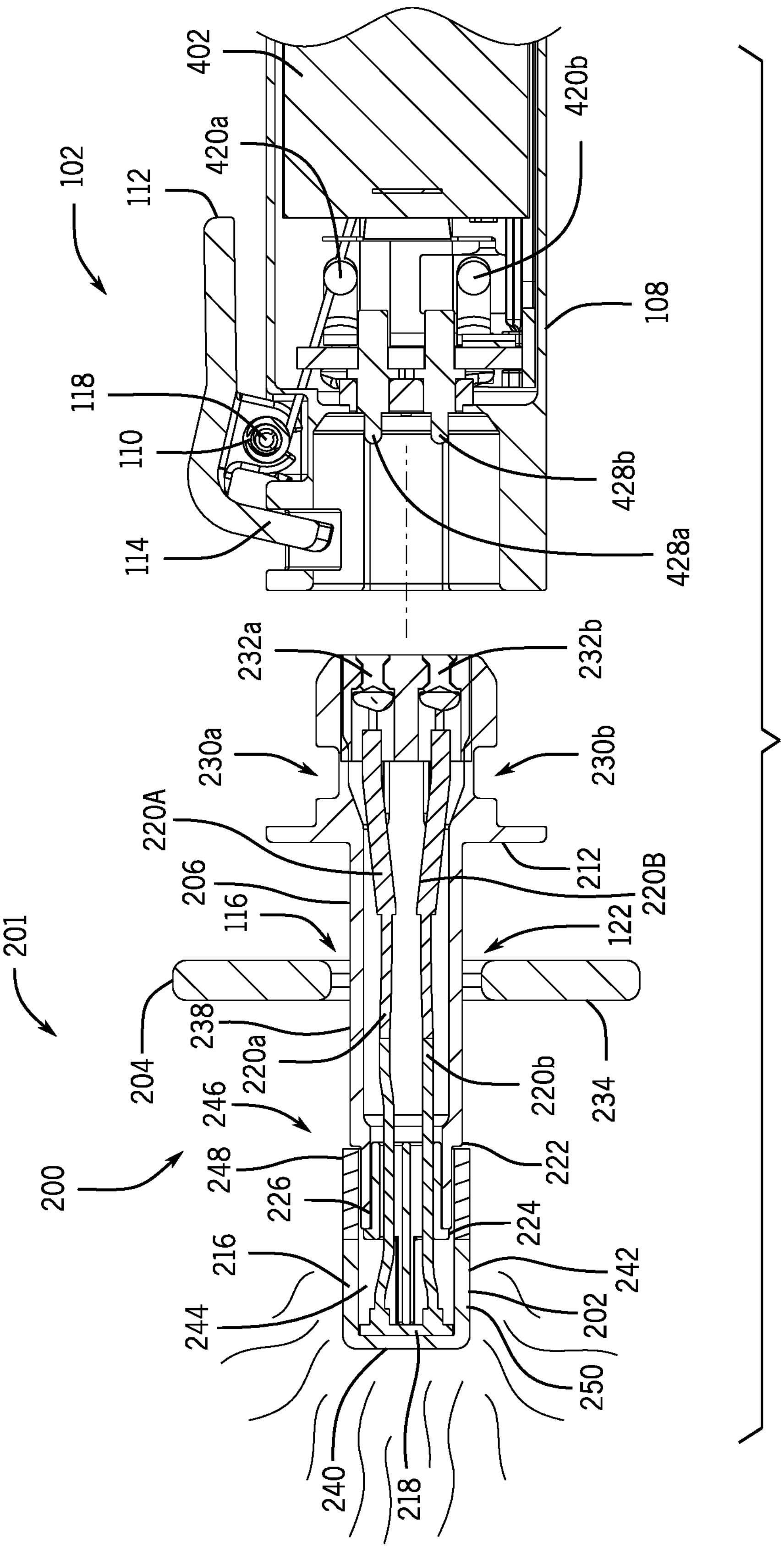
FIG. 6B is a partial exploded section view of the heating element system of FIG. 1 taken along section line 6-6 of FIG. 1.

With reference to FIGS. 4, 6A and 6B, the power distribution subsystem 406 may include one or more electrical conduits 420*a/b*. The power distribution subsystem 406 may include a printed circuit board. The electrical conduits 420*a/b* may be disposed on opposite faces of the printed circuit board. The electrical conduits 420*a/b* may be in electrical communication with respective electrical interface elements 428*a/b*. The electrical interface elements 428*a/b* may be part of a power distribution electrical interface 426 disposed on an opposite face of the printed circuit board from the electrical conduits 420*a/b*. In some embodiments, the electrical interface element 428*a/b* may be pins, sockets, contacts (e.g., spring contacts, surface contacts), or the like suitable to supply electrical power from the main body 120 to the resistive element 218.

With reference to FIGS. 1-7, the deployable element 200 may include a heating element 201 at one end. The heating element 201 may include a shaft portion 206 with a resistive element 218 coupled thereto. In some embodiments, the resistive element 218 is received in a cap 202. The shaft portion 206 may include a main portion 238 and an end portion 236. The end portion 236 may extend longitudinally from the main portion 238. In some embodiments, the cap 202 may be disposed on the end portion 236 such that the cap 202 covers or encloses the resistive element 218.

The shaft 206 may include a deployable element physical interface 210 at the end opposite the heating element 201. The deployable element physical interface 210 may support or include a deployable element electrical interface 208 suitable to receive power from the main body 120. The resistive element 218 is operative to receive electrical power (e.g., from the main body 120) and convert that electrical power into heat.

A flange 212 may be fixedly disposed on the shaft 206 between the cap 202 and the deployable element physical interface 210. A removable cover 204 may be received on the shaft 206 (see, e.g., FIGS. 5A and 5B). As best shown in FIG. 6A-6B, the cover 204 may have an aperture 116 formed therein. The aperture 116 may form an air intake 116. The air intake 116 may be sized to receive the shaft 206. The air intake 116 may have a clearance 122 relative to the shaft 206.

As shown for example in FIGS. 4, 6A and 6B, the deployable element electrical interface 208 may include one or more electrical interface elements 232*a/b*. The electrical interface element 232*a/b* may include electrically conductive pins, sockets, contacts (e.g., spring contacts, surface contacts), or the like suitable to receive electrical power from the main body 120. The electrical interface element 232*a/b* may be in electrical communication with respective electrical conduits 220*a/b*. The electrical conduits 220*a/b* may provide electrical power to the resistive element 218.

Figure 7:
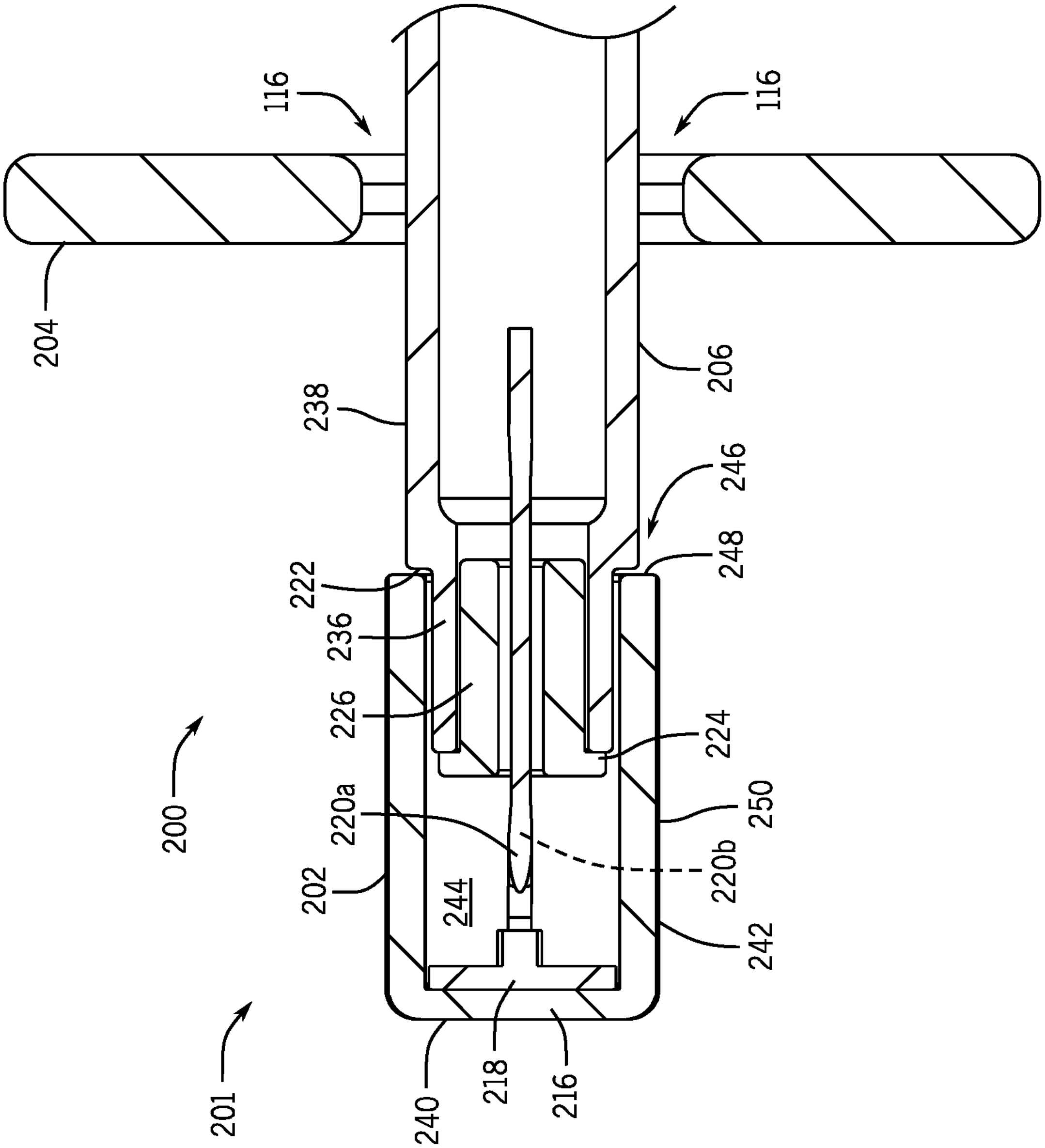
FIG. 7 is a partial section view of the deployable element of FIG. 1 taken along section line 7-7- of FIG. 1.

As shown for example in FIGS. 6A, 6B and 7, the shaft 206 may have an end portion 236. The end portion 236 may define a smaller diameter than an adjacent main portion 238 of the shaft 206, forming a shoulder 222 extending annularly around the shaft 206. The cap 202 may have a main body 242 with a first closed end 240 and a circumferential wall 250 extending longitudinally from the closed end 240. The circumferential wall 250 and closed end 240 may define an interior chamber 244, with an open end 246 defined by a rim 248 which allows elements of the heating element 201 to be received in the interior chamber 244. The main body 242 may be cylindrical in shape with a circular cross section, or it may have other cross-sectional shapes such as square, ovoid, rectangular, triangular, other polygons or irregular shapes. The end portion 236 is sized to be received in the open end 246 of the cap 202, with the positioning within the interior chamber 244 defined by the engagement of the rim 248 and the shoulder 222. For example, the shoulder 222 may act as a seat for the cap 202. A plug 226 may be received in the end portion 236. The plug 226 may also insulate the end portion 236 from the resistive element 218. For example, the plug 226 may include a heat barrier 224 that reduces conduction, convection, and/or radiation from the resistive element 218 from being transmitted in a direction along the shaft 206 towards the main body 120 of the device 100. The heat barrier 224 may aid in retaining the heat energy at the terminal end 240 of the cap 202 in order to allow the focus region 216 to achieve the desired temperature, remain at the desired temperature, and be more effective at vaporizing the vaporizable material 808. The casing 108 may remain at temperatures that are comfortable and/or safe for a user to hold in their hand. For example, the heat barrier 224 may help keep the surface temperature of portions of the heating apparatus 100 held by the user (e.g., the casing 108) at a temperature less than about 90° F. such that the user is not burned and that the heating apparatus 100 is comfortable to hold. For example, the casing 108 may be at less than about 60° F., 70° F., 80° F., or 90° F. through one, two three, four, five or more sequential heating cycles with about 5 to 10-seconds of downtime between each cycle and about one minute of downtime between each sets of five sequential heating cycles.

The resistive element 218 and the heat barrier 224 may form a focus region 216 on the cap 202. The focus region 216 may be an area or portion of the resistive element 218 intended to be in contact with the vaporizable material 808 and which is intended (all, most, a portion of, at least the facial portion of the tip) to be heated to the desired temperatures for effective vaporizing. Beyond the focus region 216 the cap 202 may reach the intended temperatures for effective vaporizing. In one example, the focus region 216 may reach the intended temperature, and may be the highest temperature on the deployable element 200. In some embodiments, the plug 226 is formed of a heat resistant material such as glass, metal, or ceramic. The examples of the shaft 206, end portion 236, and cap 202 are substantially cylindrical. However, other shapes of these components may be used as desired for use with various smoking apparatus (e.g., shafts with square, rectangular, ovoid, or irregular cross sections). In some embodiments, the shaft 206 may be straight, as in the examples shown. In other embodiments, the shaft 206 may be curved, bent, or bendable. In some examples, the cap 202 may be optional, such that the resistive element 218 is exposed and put directly in contact with the vaporizable material 808. The electrical conduits 220*a/b* may be insulated, such as to prevent electrical shorting.

The deployable element 200 may be selectively removed from the main body 120. For example, as shown in FIG. 6A, the deployable element physical interface 210 may be suitable to interface with the retaining mechanism 102 of the main body 120. The retaining mechanism 102 may include a handle 112 and a pawl 114. The handle 112 and pawl 114 may be biased to a latched position such as by a biasing element 110 like a spring. When the handle 112 and pawl 114 are biased to the latched position, the pawl 114 may be received in one of the receptacles 230*a/b* thus retaining the deployable element 200 with the main body 120. As shown in FIG. 6B, when the handle 112 is depressed (e.g., by a user's fingers) to a sufficient extent to overcome the bias of the biasing element 110, the handle 112 and pawl 114 may rotate such that the pawl 114 is withdrawn from the receptacle 230*a/b*. The deployable element 200 may be separated from the main body 120. Other suitable retaining mechanisms may be used, as desired, such as bayonet mount (e.g., twist lock connectors), ball and detent connectors, threaded-screw-type connectors, or the like. The deployable element physical interface 210 may include one or more receptacles 230*a/b*.

Figure 9A:
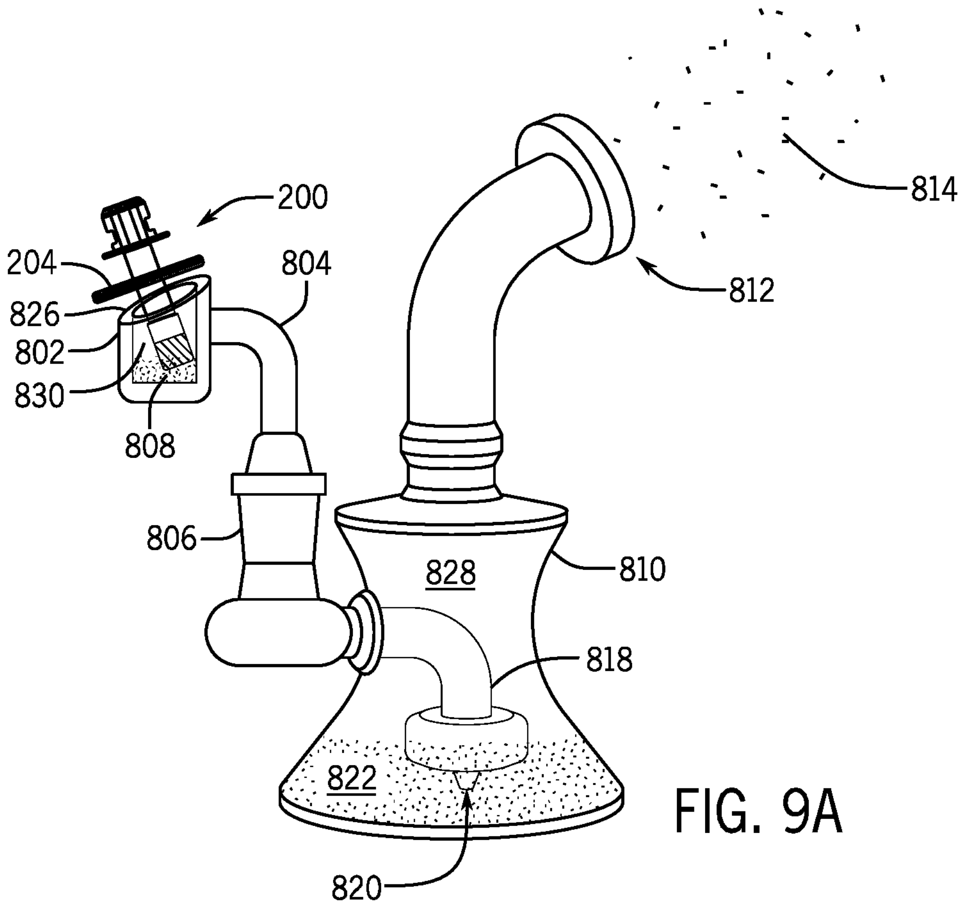
FIG. 9A shows a method of using the deployable element of the system of FIG. 1.
Figure 9B:
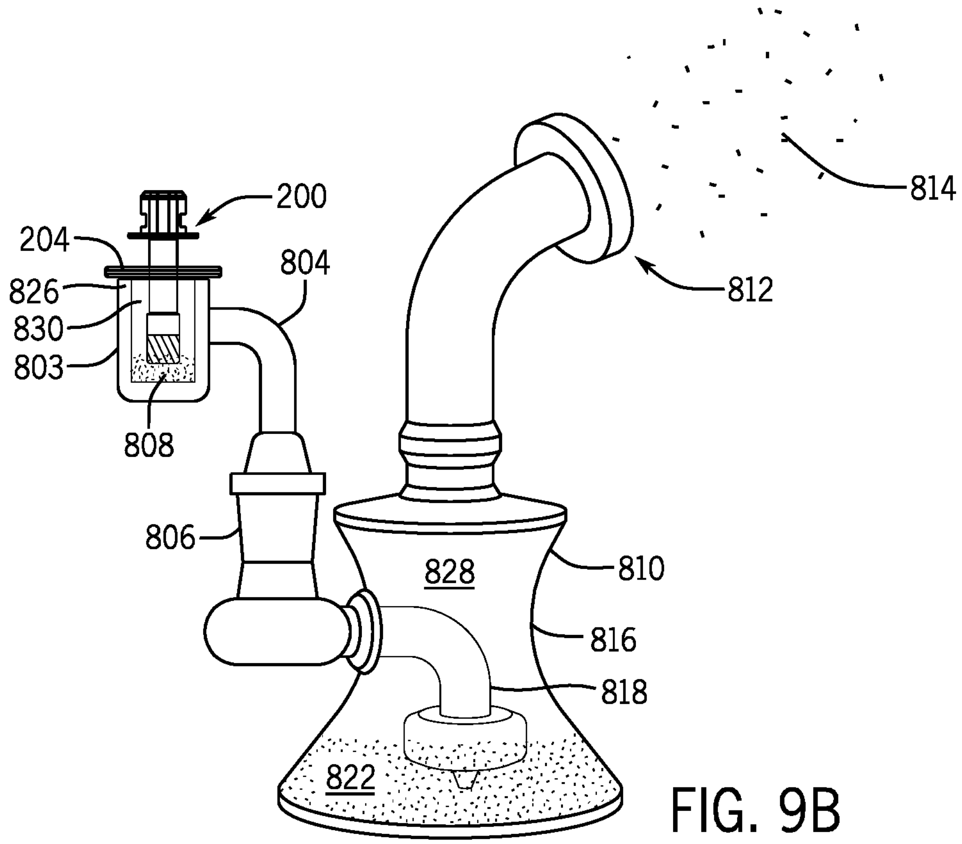
FIG. 9B shows a method of using the deployable element of the system of FIG. 1.

FIGS. 6A/B, 8A/B, and 9A/B show examples of using the heating apparatus 100 with a smoking apparatus 810 to vaporize a vaporizable material 808. The smoking apparatus 810 may include a body 816 with an internal compartment 828. The smoking apparatus 810 may include a container 802 with an open top to allow access to an internal volume 830 of the container 802. The container 802 may have an upper surface 826 that is substantially aligned with the bottom of the body 816 (e.g., as shown in FIG. 9B). In some embodiments, the container 802 may include a slanted upper surface 826 (e.g., as shown in FIG. 9A). The container 802 may be in fluid communication with a fluid conduit 804. The fluid conduit 804 may be removable from the smoking apparatus 810 such as via a fluid interface 806. The fluid conduit 804 may be in fluid communication with a down stem 818 disposed in the internal compartment 828 of the body 816. The down stem 818 may include a percolator 820 at a lower end thereof. The internal compartment 828 of the body 816 may contain a liquid 822, such as water, at a level above the percolator 820. A mouthpiece 812 may be in fluid communication with an upper portion of the body 816. A vaporizable material 808, such as wax, oil, concentrate, or the like may be placed in the internal volume 830 of the container 802.

Figure 8B:
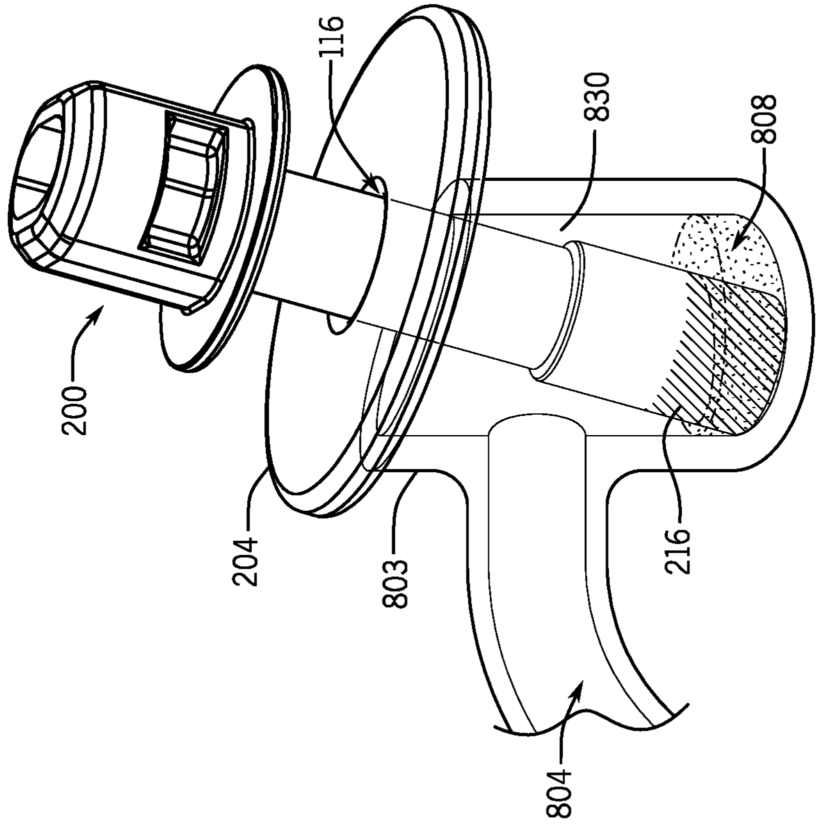
FIG. 8B shows a method of using the deployable element of the system of FIG. 1.
Figure 8A:
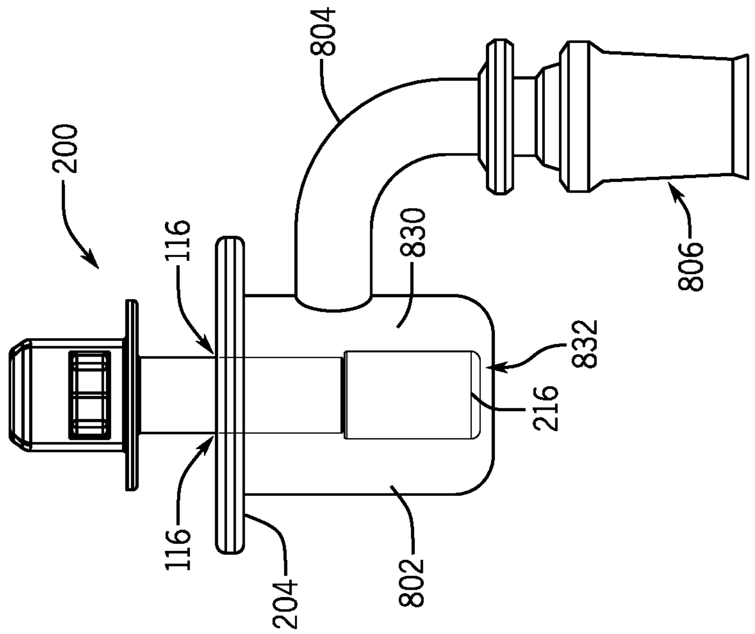
FIG. 8A shows a method of using the deployable element of the system of FIG. 1.

The deployable element 200 may be removed from the main body 120, for example by activating the retaining mechanism 102, as described herein. The hot deployable element 200 may be inserted into a container 802 and the focus region 216 may make contact with the vaporizable material 808. A gap 832 may be formed between the bottom of the container 802 and the end of the heating element 201 (e.g., the end 240 of the cap 202, if used). The vaporizable material 808 may be present in the gap 832 such that the vaporizable material 808 contacts the heating element 201 and vaporizes. The vaporizable material 808 may be a liquid or solid at ambient temperatures (e.g., before being heated with the resistive element 218) and may remain, or become, a liquid upon heating with the heating apparatus. As shown for example in FIGS. 8A, 9A and 9B, the deployable element 200 may be submerged into liquid during its heating cycle. In some examples, the cap 202 and portions of the shaft 206 may be submerged in liquid. Thus, the deployable element electrical interface 208 may be resistant to liquid ingress. The flange 212 and or the cover 204 may reduce the migration of liquid into the deployable element electrical interface 208.

The focus region 216 of the deployable element 200 may be hot enough to cause the vaporizable material 808 to vaporize into a vaporized material 814. The cover 204 may be placed in contact with the upper surface 826 forming a seal there between to contain the vaporized material 814 in the internal volume 830 of the container 802. A user may place their mouth on the mouthpiece 812 and draw in a breath. Air may enter the internal volume 830 through the air intake 116. The air may carry the vaporized material 814 from the internal volume 830 into the fluid conduit 804 and into the down stem 818. The vaporized material 814 may pass from the down stem 818 through the percolator 820. The vaporized material 814 may bubble through the liquid 822. The vaporized material 814 may be cooled and or mellowed by the liquid 822. The vaporized material 814 may pass out of the liquid 822 into an upper portion of the internal compartment 828 into the mouthpiece 812 and into the user's lungs.

The temperature to which the resistive element 218 heats may be set by the user. The heating apparatus 100 may have multiple temperature settings. For example, the heating apparatus 100 may have one, two, three, four, or more temperature settings. In some examples, the heating apparatus 100 may have four temperature settings as follows: 475° F., 575° F., 675° F., and 750° F. Temperature settings may be held to within a tolerance of a nominal value, for example, ±5° F., ±10° F., or ±20° F. or more. The desired temperature may be an external temperature of the focus region 216. For example, the resistive element 218 may be heated to a higher temperature than the desired temperature of the focus region 216 to account for thermal resistance and/or heat losses through the cap 202. The user may set the temperature using the user input 106. The processing element 422 of the control subsystem 424 may interpret a signal received from the user input 106 and accordingly adjust an amount of electrical current or voltage that may be applied to the resistive element 218, via the power distribution subsystem 406. Additionally, or alternately, the processing element 422 may control the amount of time for which the resistive element 218 is powered. In some embodiments, a sensor may detect the temperature of the resistive element 218 or another portion of the deployable element 200 and adjust the current, voltage, and/or time to achieve the desired temperature. Once the resistive element 218 has achieved the desired temperature, the resistive element 218 may be held at that temperature for a desired amount of time (e.g., 5, 10, 15, 20, 25, or 30 seconds or longer) by adjusting the current and/or voltage applied to the resistive element 218.

The heating apparatus 100 may be adapted to function in most environments experienced by a user. For example, the heating apparatus 100 may operate in ambient temperatures between about 41° F. (5° C.) to about 104° F. (40° C.). The heating apparatus 100 may operate at altitudes of less than 0 meters below sea level (e.g., as low as about −413 meters) to about 3000 meters or higher. The heating apparatus 100 may operate in relative humidity levels of between about 10% to about 80%. In some embodiments, the heating apparatus 100 may operate in ambient temperatures between about −4° F. (−20° C.) to about 140° F. (60° C.), elevations up to 5000 meters, and relative humidity levels of up to about 90%. The heating apparatus 100 may experience shocks such as being dropped from about 2 feet without functional damage.

For example the heating apparatus 100 may operate in a desert, on top of a snowy mountain peak, or in a rainy jungle. Thus, the heating apparatus 100 may have certain advantages over an open flame in vaporizing a vaporizable material 808. Butane and other fuels consume oxygen, which is in low concentrations at high elevations making open flame torches hard to use in such environments. Similarly, an advantage of the heating apparatus 100 may be the ability to operate in a damp or rainy environment where an open flame is difficult to start or maintain.

Figure 10:
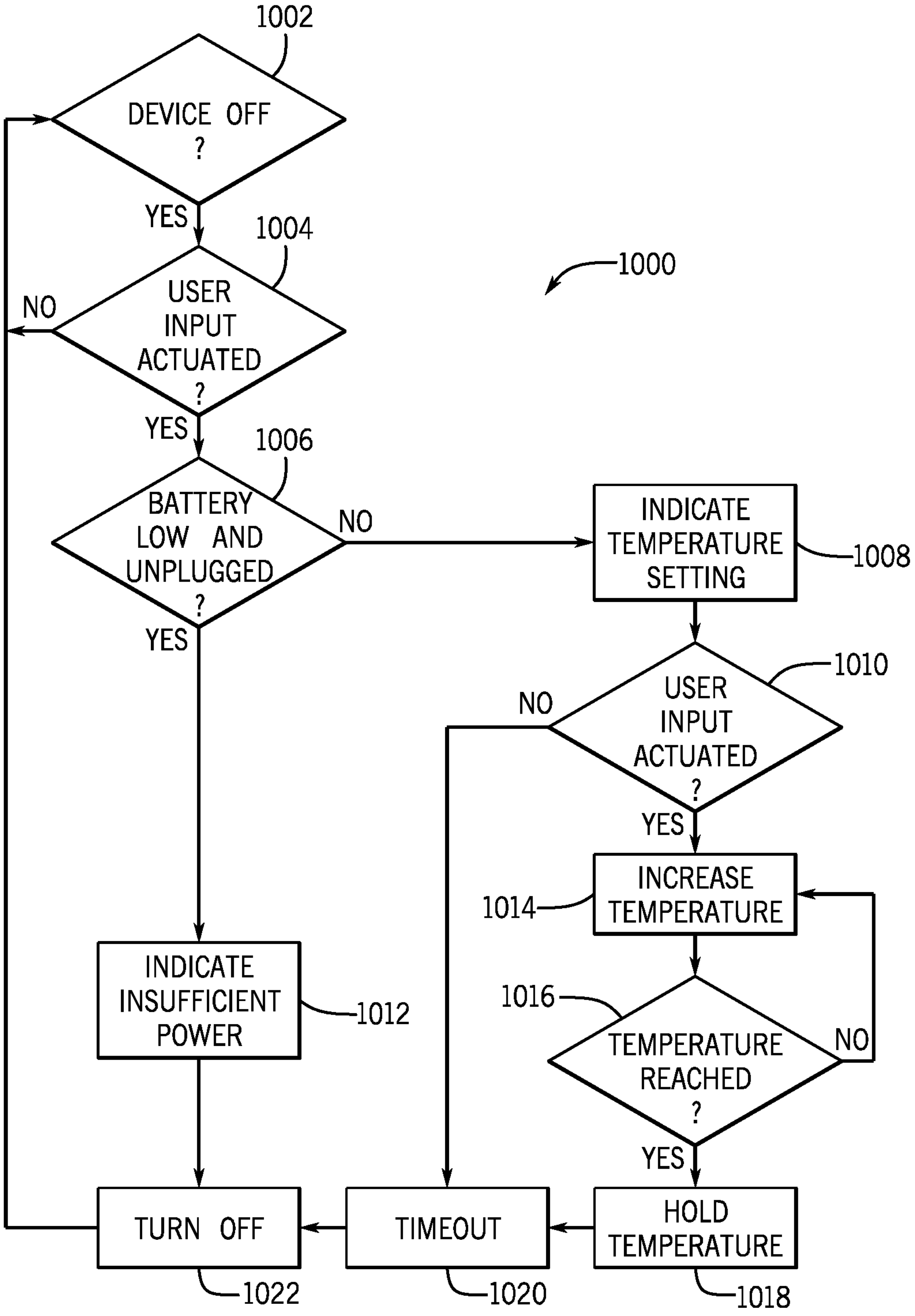
FIG. 10 is a method of controlling the system of FIG. 1.
Figure 11:
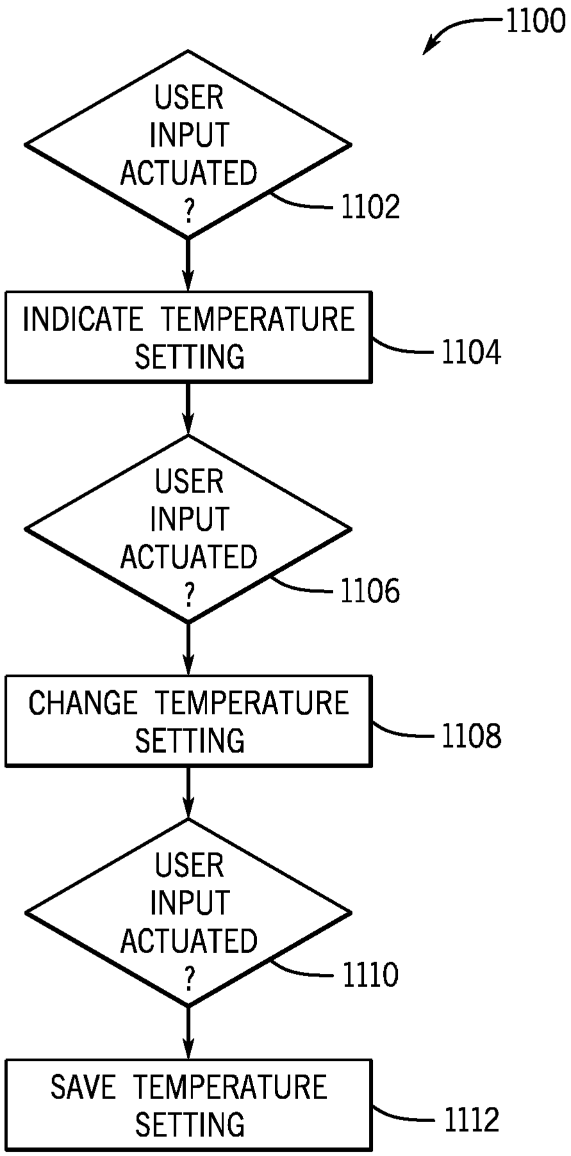
FIG. 11 is a method of controlling the system of FIG. 1.
Figure 12:
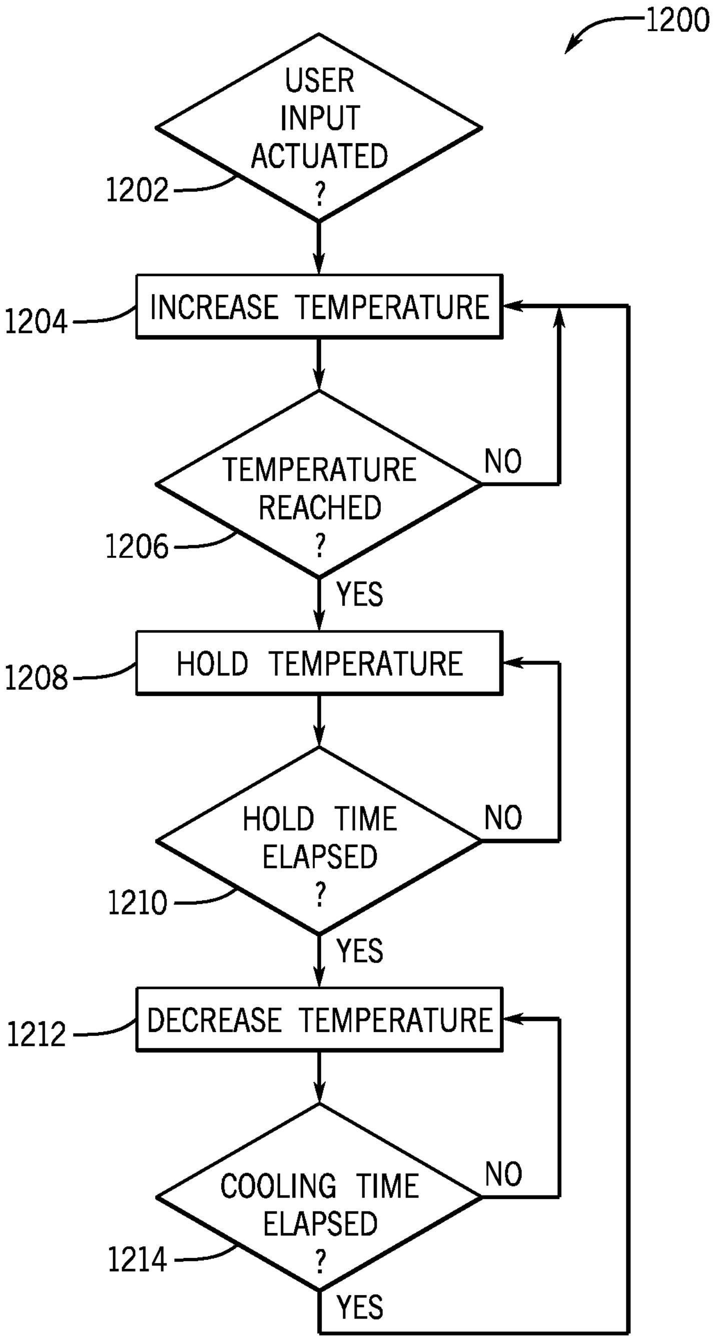
FIG. 12 is a method of cleaning the system of FIG. 1.

As described in more detail with respect to the methods shown in FIG. 10-FIG. 12, a user may activate the heating apparatus 100, such as via the user input 106. The control subsystem 424 may receive a signal from the user input 106 that indicates electrical power should be supplied to the resistive element 218. The electrical power may be supplied from either the power supply 402, the power receptacle 410 and/or the power receptacle 412. The control subsystem 424 may supply power to the resistive element 218 until the resistive element 218 reaches a desired temperature, for a set time, or both.

FIG. 10 is a flowchart of a method 1000 for controlling the heating apparatus 100. The method 1000 may begin in operation 1002 and the processing element 422 determines if the heating apparatus 100 is in an off or depowered state. The processing element 422 may wait in operation 1002 until the user input 106 is activated, such as in operation 1004, for example if a user presses the user input 106. If the user input 106 is not activated, the processing element 422 may continue to wait for such an activation. If the user input 106 is activated, the processing element 422 may proceed to operation 1006. In some examples, the operation 1004 may be satisfied if the user activates the user input 106 one, two, three or more times. For example, if the user pushes the user input 106 three times, the operation 1004 may proceed to operation 1006. In some examples, operation 1004 may be satisfied if the user activates the user input 106 a number of times within a time limit. For example, the operation 1006 may be satisfied if the user pushes the user input 106 one, two, three or more times within a time limit (e.g., within one, two, three, four five, or more seconds).

In operation 1006, the processing element 422 may determine if the power supply 402 is at a low state of charge (e.g., the battery is dead or discharged). The processing element 422 may determine if an external power supply is supplying power to the power receptacle 410 and/or the power receptacle 412. If the power supply 402 is discharged and no external power supply is connected, the operation 1006 may proceed to operation 1012. If either the power supply 402 has sufficient charge to provide power for a heating cycle or an external power source is connected to the power receptacle 410 and/or power receptacle 412, the method 1000 may proceed to operation 1008.

In operation 1012, the processing element 422 may cause the indicator 104 to indicate that the heating apparatus 100 lacks sufficient power for a heating cycle. For example, the indicator 104 may flash a two-beat red color. The method 1000 may proceed to operation 1022 and the processing element 422 turns the heating apparatus 100 off. The method 1000 may return to operation 1002.

In operation 1008 the processing element 422 may cause the indicator 104 to indicate a temperature setting for the heating apparatus 100. Some example color indications and temperature settings are shown in Table 1. For example, the indicator 104 may pulsate with the respective color for a given temperature setting. Other colors and/or temperature settings may be used, as desired. The method 1000 may proceed to operation 1010.

In operation 1010, the processing element 422 may wait for an activation of the user input 106. For example, the processing element 422 may wait for a user to double click the user input 106. Other suitable activations such as a push and hold, single click, triple click, etc., may be used. If the user input 106 is not activated within a time window (e.g., 1, 2, 3, 4, or more minutes), the method 1000 may proceed to operation 1020 and the method 1000 times out, returning to operation 1022 and turning off. If the user input 106 is activated, the method 1000 may proceed to operation 1014.

In operation 1014, the processing element 422 may cause the power supply 402 and/or external power source via the power receptacle 410 and/or power receptacle 412 to provide power to the resistive element 218, such as via the power distribution subsystem 406. The temperature of the resistive element 218 and the focus region 216 may increase.

The method 1000 may proceed to operation 1016 and the processing element 422 determines whether the focus region 216 has reached the desired temperature (such as with a sensor), a time limit has elapsed, or both. If, in operation 1016, the temperature has not been reached, the method 1000 may return to operation 1014 and the processing element 422 may continue increasing the temperature of the resistive element 218 and/or focus region 216 by providing power to the resistive element 218. When the temperature has been reached and/or the time limit has elapsed, the method 1000 may proceed to operation 1018.

In operation 1018, the temperature of the focus region 216 may be held for a predetermined time. For example, the processing element 422 may hold the temperature of the focus region 216 at the desired temperature for 10, 20, 30 or more seconds. After the predetermined time, the method 1000 may proceed, to operation 1020 and the method 1000 times out.

FIG. 11 is a flowchart of a method 1100 for controlling the heating apparatus 100. For example, the method 1100 may be suitable to change a temperature setting of the heating apparatus 100. The method 1100 may begin in operation 1102 and the processing element 422 determines if the user input 106 is activated. For example, if the user input 106 is activated for a predetermined period of time (e.g., 1, 2, 3, 4, 5 or more seconds) the method 1100 may proceed to operation 1104.

In operation 1104, the processing element 422 may cause the indicator 104 to indicate the current temperature setting. Examples of such indications are shown in Table 1. The method 1100 may proceed to operation 1106.

In operation 1106, the processing element 422 may await a further activation of the user input 106. For example, the processing element 422 may wait for a single activation of the user input 106. In operation 1108, the processing element 422 may cycle through temperature settings with successive activations of the user input 106. For example, on entering operation 1106, the heating apparatus 100 may have been set for 475° F. and the indicator 104 may indicate green. The user input 106 may be activated and the processing element 422 increments the temperature setting to the next level. For example, the temperature setting may be changed to 575° F. and the indicator 104 may indicate green. With another activation of the user input 106, the processing element 422 may increment the temperature setting to 675° F. and the indicator 104 may indicate amber. With another activation of the user input 106, the processing element 422 may increment the temperature setting to 750° F. and the indicator 104 may indicate red. With another activation of the user input 106, the processing element 422 may cycle the indicator 104 through a series of colors indicating that the temperature setting has been returned to a lower level (e.g., 475° F.). Some example temperature settings and colors are shown in Table 1. Other suitable colors and/or temperatures may be used as desired.

The method 1100 may proceed to operation 1110 and the processing element 422 waits for an activation of the user input 106. For example, the user input 106 may be held for a predetermined amount of time (e.g., 1, 2, 3, 4, or more seconds). The method 1100 may proceed to operation 1112.

In operation 1112, the temperature setting set in operation 1108 may be saved. For example, the temperature setting may be saved in the memory component 430. The memory component 430 may be non-volatile such that even if the heating apparatus 100 loses power, the temperature setting may be retained.

FIG. 12 is a flowchart of a method 1200 for cleaning the heating apparatus 100. The method 1200 may begin in operation 1202 and the processing element 422 waits for an activation of the user input 106. For example, the user input 106 may be held for a predetermined amount of time (e.g., 1, 2, 3, 4, or more seconds). The method 1200 may proceed to operation 1204 and the temperature of the resistive element 218 is increased. The operation 1204 may be similar to operation 1014, further description of which is omitted, for brevity. The method 1200 may proceed to operation 1206 and the processing element 422 determines if the desired temperature has been reached. For example, the temperature set point may be 700° F. or higher. Such high temperatures may be effective at burning residue or contamination off of the deployable element. The operation 1026 may be similar to operation 1016, further description of which is omitted, for brevity. The method 1200 may proceed to operation 1208 and the temperature of the resistive element 218 or focus region 216 is held. The operation 1208 may be similar to operation 1018, further description of which is omitted, for brevity. The method 1200 may proceed to operation 1210.

In operation 1210, the processing element 422 may hold the temperature of the resistive element 218 and/or focus region 216 for a predetermined time, e.g., 10, 20, 30 or more seconds. The method 1200 may proceed to operation 1212 and the power to the resistive element 218 is turned off, allowing the resistive element 218 to cool. The method 1200 may proceed to operation 1214.

In operation 1214, the processing element 422 may wait for a predetermined amount of time for the resistive element 218 and/or focus region 216 to cool (e.g., 10, 20, 30, 40, or more seconds). The processing element 422 may cause the indicator 104 to indicate that the cooling is complete. The method 1200 may return to operation 1204 one or more times thereby cycling the temperature of the resistive element 218 and/or focus region 216 between high and low temperatures until the cycle has completed a desired number of times or the user ends the cycle by activating the user input 106, e.g., by holding the user input 106 for 1, 2, 3, or more seconds.

The operations of the methods 1000, 1100, and/or 1200 may be executed in orders other than as presented. During any operation of the methods herein, the indicator 104 may indicate status to and/or request input from the user. Some examples of the methods 1000, 1100, and/or method 1200 are shown in Tables 1 and 2. Activations of the user input 106 described are by way of example only. Any of the user input 106 activations described herein may include other suitable types of activations such as press and hold, single activation, multiple sequential activations, combinations of long and short activations and combinations of these. The examples are illustrative only and in no way limiting.

EXAMPLES

TABLE 1

Example indicator 104 colors and related temperature set points

| LED Color | Definition |
|---|---|
| Blue | Temperature Setting 475° F. |
| Green | Temperature Setting 575° F., Battery is sufficiently charged |
| Amber | Temperature Setting 675° F., Overheating, Short Circuit |
| Red | Temperature Setting 750° F., Low Battery, Charging incomplete |

TABLE 2

Example indicator 104 behaviors and related indications

| LED Behavior | Status indication |
|---|---|
| 2-beat red upon wakeup | Battery Low, Charge battery |
| Single Gradual Pulse Blue | Current Temperature Setting 475° F. |
| Single Gradual Pulse Green | Current Temperature Setting 575° F. |
| Single Gradual Pulse Amber | Current Temperature Setting 675° F. |
| Single Gradual Pulse Red | Current Temperature Setting 750° F. |
| Sequential Pulse Blue (3-4 pulses) | Heating up to 475° F. |
| Sequential Pulse Green (3-4 pulses) | Heating up to 575° F. |
| Sequential Pulse Amber (3-4 pulses) | Heating up to 675° F. |
| Sequential Pulse Red (3-4 pulses) | Heating up to 750° F. |
| Holding Blue (after heat up) | Temperature of element is at 475° F. |
| Holding Green (after heat up) | Temperature of element is at 575° F. |
| Holding Amber(after heat up) | Temperature of element is at 675° F. |
| Holding Red (after heat up) | Temperature of element is at 750° F. |
| Holding Blue (in temp setting mode) | Waiting for user input, presenting 475° F. temperature option |
| Holding Green (in temp setting mode) | Waiting for user input, presenting 575° F. temperature option |
| Holding Amber (in temp setting mode) | Waiting for user input, presenting 675° F. temperature option |
| Holding Red (in temp setting mode) | Waiting for user input, presenting 750° F. temperature option |
| Holding Amber | Overheated, cool down |
| Flashing Amber (5 flashes) | Servicing or Repair |
| Holding Green (While plugged in AND OFF) | Charging complete |
| Holding Red (While plugged in AND OFF) | Charging incomplete |

With reference to FIG. 13A-FIG. 13D, an embodiment of a heating apparatus 113 is disclosed. In many aspects, the heating apparatus 113 is similar to the heating apparatus 100. For example, the heating apparatus 113 includes a main body 120, a retaining mechanism, a power supply 402, a power distribution subsystem 406, and a deployable element. The heating apparatus 113 may include an embodiment of a deployable element 1300 and a retaining mechanism 1302 different than those of the heating apparatus 100.

Figure 13A:
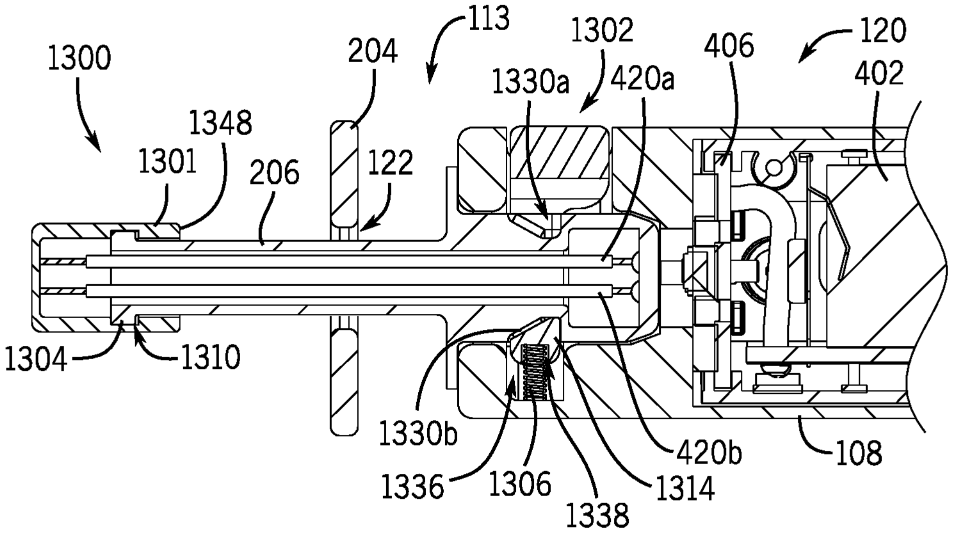
FIG. 13A is a partial section view of an embodiment of a heating element system.
Figure 13B:
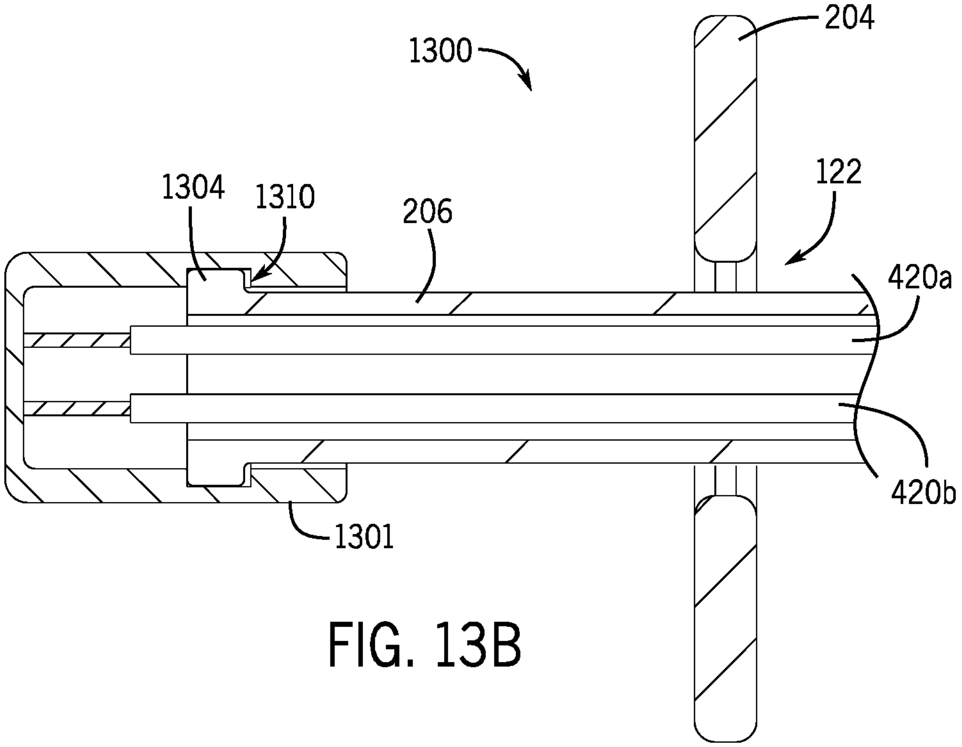
FIG. 13B is a detail view of the heating element system of FIG. 13A.

As shown in FIG. 13A, and in greater detail in FIG. 13B, the deployable element 1300 includes a body portion 1328 and shaft 206 extending from the body portion 1328. A flange 212 may be formed between the body portion 1328 and the shaft 206. The flange 212 may have a larger dimension than the body portion 1328 and/or the shaft 206. The deployable element 1300 may include a cover 204 which may be received on the shaft 206. A clearance 122 may be formed between the cover 204 and the clearance 122, as previously described. The body portion 1328 includes one or more electrical interface elements 1332 similar to the electrical interface elements 232 previously described. The body portion 1328 may include a physical interface 1340 suitable to couple the deployable element 1300 to the retaining mechanism 1302. The electrical interface element 1332 may electrically interface with the power distribution subsystem 406 to supply electrical power to the deployable element 1300. One or more electrical conduits **420*a/b* may be in electrical communication with the electrical interface element 1332 and may pass through the shaft 206 to a cover 1301. The shaft 206 includes a boss 1304 that has a larger diameter at a portion of the shaft 206 received in the cover 1301. The cover 1301 may include a recess 1310 formed on an inner portion thereof and configured to receive the boss 1304 to secure the cover 1301 to the shaft 206**.

The cover 1301 may be activated similarly to the heating element 201, as previously described. In contrast to the heater cover 202, the heater cover 1301 includes features that provide for a heating feature or structure integral with the cover 1301. For example, the electrical conduits **420*a/b* may electrically connect to the cover 1301. The cover 1301 may have an electrical resistance property such that when an electrical current is supplied to the cover 1301 by the electrical conduits 420*a/b*, the temperature of the cover 1301 increases such as via Ohm's Law heating. The heating power of the cover 1301 may be modeled as P=IV, where (P) is the electrical power supplied to the cover 1301, (I) is the electrical current, and (V) is the voltage at which the electrical current is supplied. Under principles of energy conservation, the heating power of the cover 1301 may be substantially the same as the power electrically supplied to the cover 1301**. Advantages of this approach may include fewer parts, lower cost, increased reliability, and/or better heating, such as due to the lack of a thermal resistance between the cover and a separate heating element.

Figure 13C:
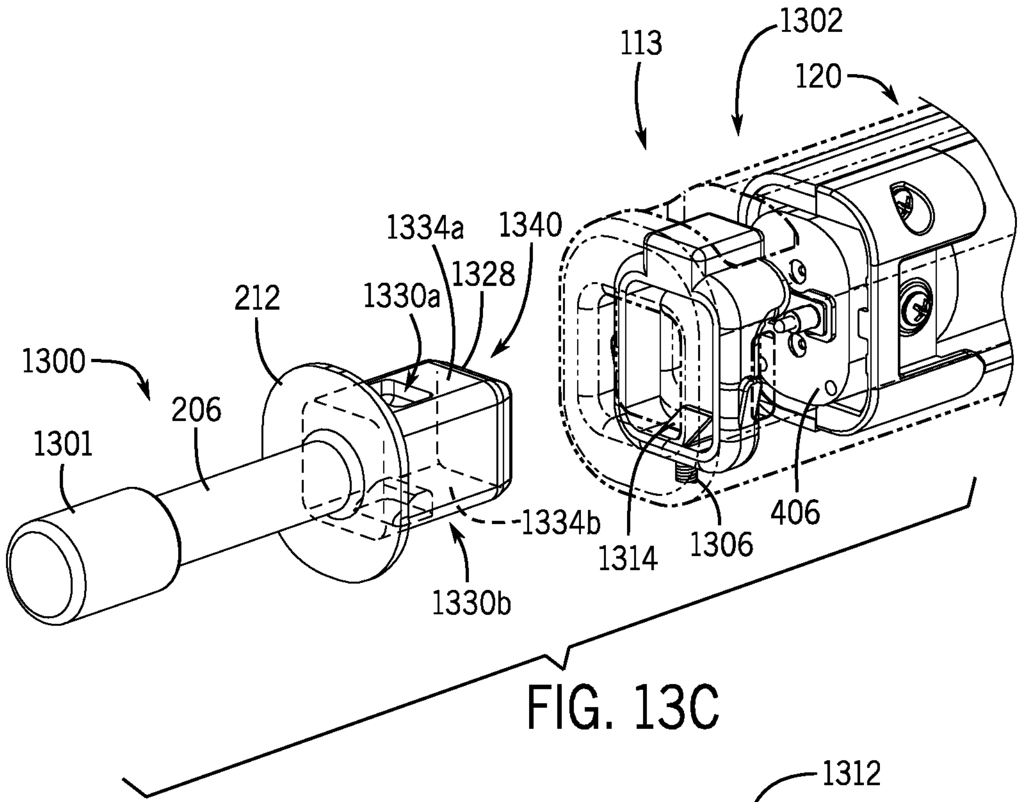
FIG. 13C is a partially exploded isometric view of the heating element system of FIG. 13A in a first configuration.
Figure 13D:
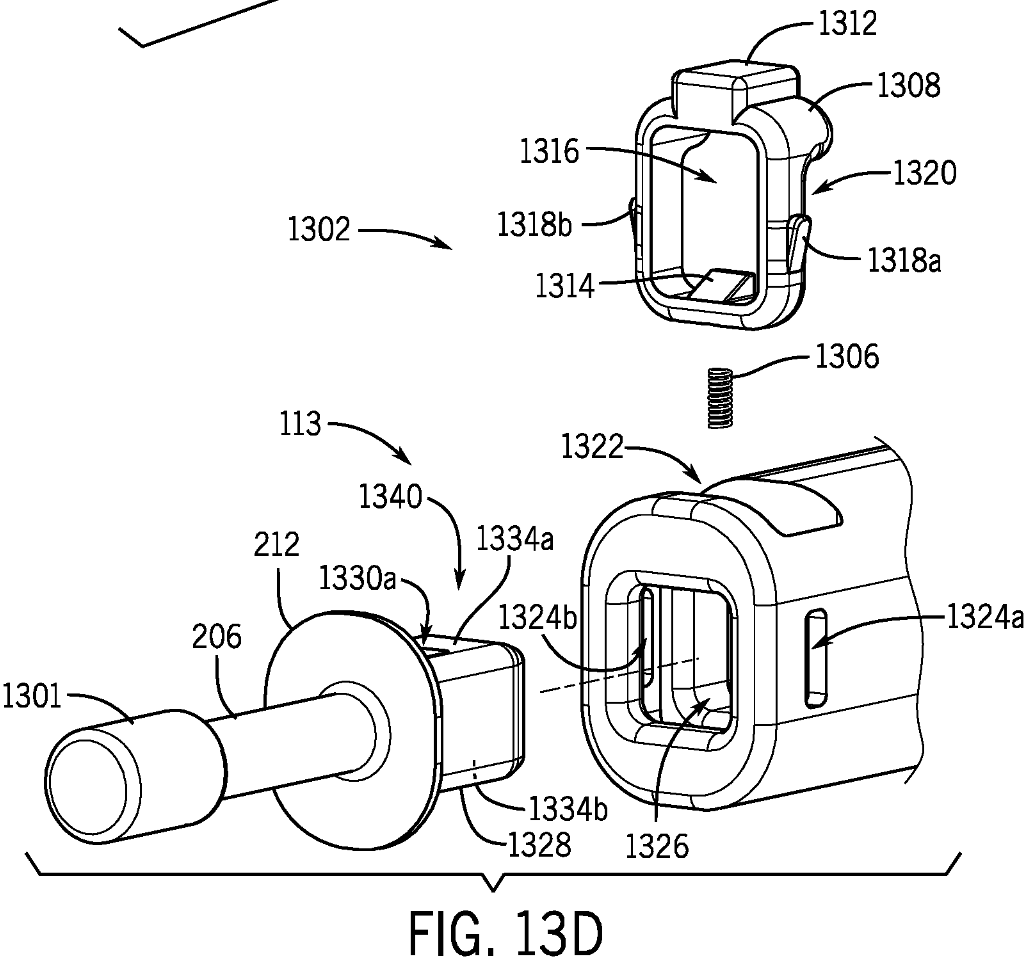
FIG. 13D is a partially exploded isometric view of the heating element system of FIG. 13A in a first configuration.

As shown for example in FIG. 13C and FIG. 13D, the deployable element 1300 is selectively removable from the main body 120 by the action of the retaining mechanism 1302. In other embodiments, the deployable element 1300 may include features similar to the deployable element 200 that enable it to interface with the heating apparatus 100. The retaining mechanism 1302 includes a carriage body 1308 and a resilient element 1306. The carriage body 1308 may generally form a rim 1320 that defines an aperture 1316 disposed in a central portion of the rim 1320. In the embodiment shown, the rim 1320 is substantially rectangular. In other embodiments, the rim 1320 may be other shapes, such as square, round, ovoid, other polygons, irregular shapes, or the like. One or more protrusions may extend from the rim 1320 either outwardly (i.e., away from the aperture 1316) or inwardly (i.e., toward the aperture 1316). For example a first protrusion 1312 may extend outwardly from the rim 1320. The first protrusion 1312 may form an actuator or button suitable for a user to operate the retaining mechanism 1302. One or more second protrusions **1318*a/b* may extend outwardly from the rim 1320 on opposing sides of the rim 1320. The second protrusions 1318 may have a tapered or ramped profile. A pawl 1314 may extend inwardly from the rim 1320 toward the aperture 1316. The pawl 1314 may also have a tapered or ramped profile. In some embodiments, the pawl 1314 may have one or more edges that extend essentially normal to the rim 1320, e.g., along a radius of the aperture 1316**.

The main body 120 may include a receptacle 1326 formed in a portion thereof and suitable to receive the body portion 1328 of the deployable element 1300. The main body 120 may have formed in a portion thereof one or more apertures suitable to receive portions of the carriage body 1308. For example, the main body 120 may have an aperture 1322 formed in a portion thereof of a suitable shape and size to receive all, or a portion, of the carriage body 1308. For example, the aperture 1322 may have a width dimension that is the same as, or slightly larger than a width dimension of the carriage body 1308 such that the carriage body 1308 may be received within the main body 120. The main body 120 may have one or more apertures **1324*a/b* such as slots formed in portions of the main body 120. The apertures 1324*a/b* may be angularly offset from the aperture 1322 such as +/−90 degrees from the aperture 1322. The aperture 1322 typically extends through the casing 108 of the main body 120 into the receptacle 1326. The apertures 1324*a/b* may extend through the casing 108 of the main body 120 as in the examples shown or may be blind apertures that extend from the receptacle 1326 into the casing 108, but not through the casing 108. The body portion 1328 of the deployable element 1300 may have one or more receptacles 1330 formed therein. The receptacles 1330 may be disposed on opposing faces 1334***a/b* of the body portion 1328.

When assembled, the resilient element 1306 may be placed into the receptacle 1326. The casing 108 may have a recess 1336 formed therein and suitable to receive at least a portion of the resilient element 1306. The carriage body 1308 may be inserted into the aperture 1322. The rim 1320 may have a recess 1338 formed therein and suitable to receive at least a portion of the resilient element 1306. Thus, the resilient element 1306 may be captive by the recess 1336 and the recess 1338. The ramped profile of the second protrusions 1318*a/b* may be such that a lower portion of the ramp leads into the aperture 1322. As the carriage body 1308 is further inserted into the aperture 1322, the elevated portions of the ramps of the second protrusions 1318/b may "click" or "snap" into the respective apertures 1324*a/b*. For example, either or both of the casing 108 or the carriage body 1308 may be formed of materials that deform elastically, such that the carriage body 1308 may bend slightly inward toward the aperture 1316 as the carriage body 1308 is inserted into the aperture 1322 as the ramps of the second protrusion 1318*a/b* press against the casing 108. The apertures 1324*a/b* may retain the respective second protrusions 1318*a/b* in at least two degrees of freedom. For example the second protrusions 1318*a/b* may slide in the slots 1324*a/b*. This arrangement may help aid assembly as the second protrusions 1318*a/b* may tend to be easily inserted into the receptacle 1326 but may resist removal therefrom, without the use of additional fasteners, adhesives, or the like. The resilient element 1306 may bias the carriage body 1308 toward the aperture 1322.

The receptacles 1330*a/b* formed in the body portion 1328 of the deployable element 1300 may interface with and be retained by the pawl 1314 of the retaining mechanism 1302. The receptacles 1330*a/b* may be shaped to receive all or a portion of the pawl 1314. For example, as the deployable element 1300 is inserted into the receptacle 1326, the ramped profile of the pawl 1314 may be pressed by the body portion 1328, compressing the resilient element 1306 and moving the carriage body 1308 further into the aperture 1322. The deployable element 1300 may be inserted into the receptacle 1326 until one of the receptacles 1330*a/b* reaches the pawl 1314, and the resilient element 1306 "snaps" the pawl 1314 into the receptacle 1330*a/b*, thereby selectively retaining the deployable element 1300. The deployable element 1300 may be deployed by pressing on the carriage body 1308, such as by the first protrusion 1312, sufficient to overcome the bias of the resilient element 1306 and disengage the pawl 1314 from the receptacle 1330*a/b* in which the pawl 1314 received. An advantage of having the receptacles 1330 disposed on opposing faces 1334*a/b* of the body portion 1328 may be that the deployable element 1300 can be inserted into the receptacle 1326 in multiple orientations to aid ease of insertion.

FIG. 14A-FIG. 14D show an example of a deployable element 1400 suitable for use with a heating apparatus disclosed herein, such as the heating apparatus 100 or the heating apparatus 113. The deployable element 1400 includes an intake 1450 and a mouthpiece 1412 with an outlet 1452 formed therein. As shown for example, the deployable element 1400 includes a body portion 1428 and a physical interface 1340 with one or more receptacles 1430 similar to the body portion 1328 and receptacles 1330 described with respect to the deployable element 1300. Thus, the deployable element 1400 may be suitable to selectively connect to a retaining mechanism 1302. The deployable element 1400 may include features similar to the deployable element 200 that enable it to interface with the heating apparatus 100 such as via a retaining mechanism 102. The deployable element 1400 differs from other deployable elements shown in that it can contain a vaporizable material 808 therein (see, e.g., FIG. 14C and FIG. 14D). An advantage of the deployable element 1400 is that it can be used to vaporize a vaporizable material 808 without any additional hardware.

Figures 14A, 14B:
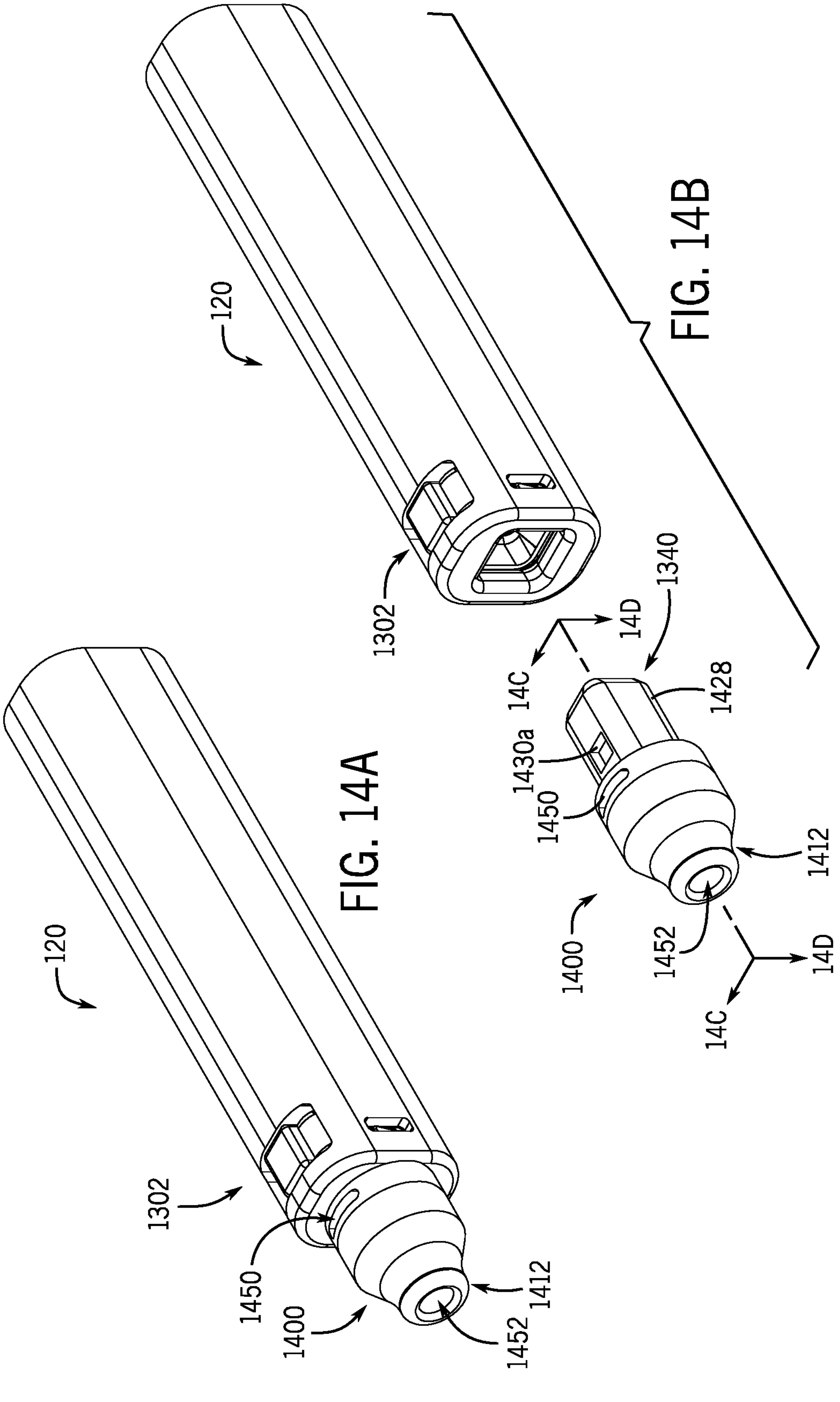
FIG. 14A is an isometric view of a deployable element suitable for use with a heating element system.
FIG. 14B is a partially exploded isometric view of the deployable element of FIG. 14A and a heating element system.
Figure 14C:
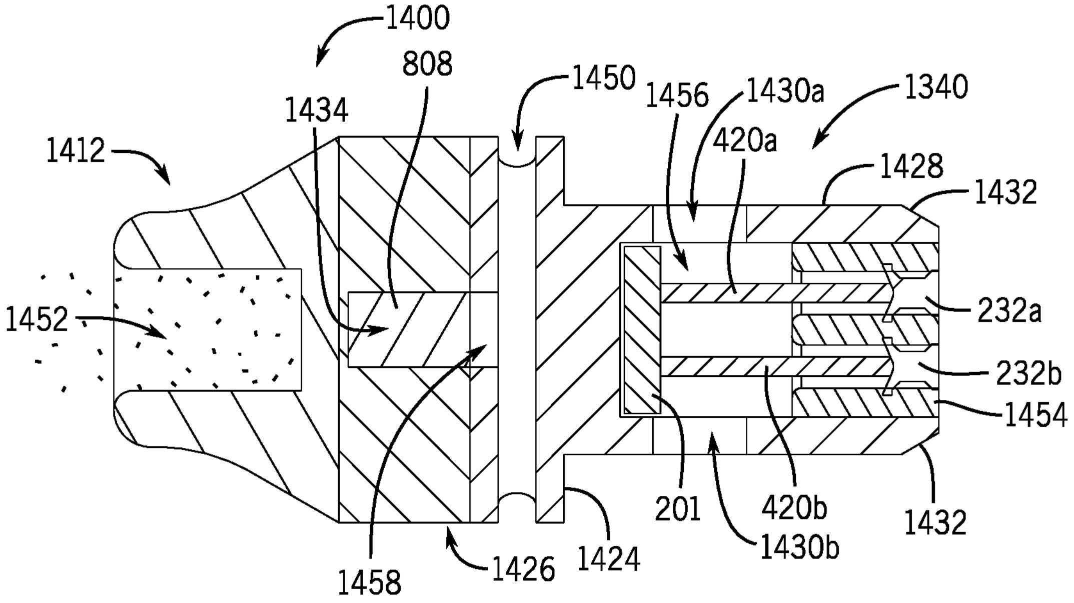
FIG. 14C is a section view of the deployable element of FIG. 14A along section line 14C-14C of FIG. 14A.
Figure 14D:
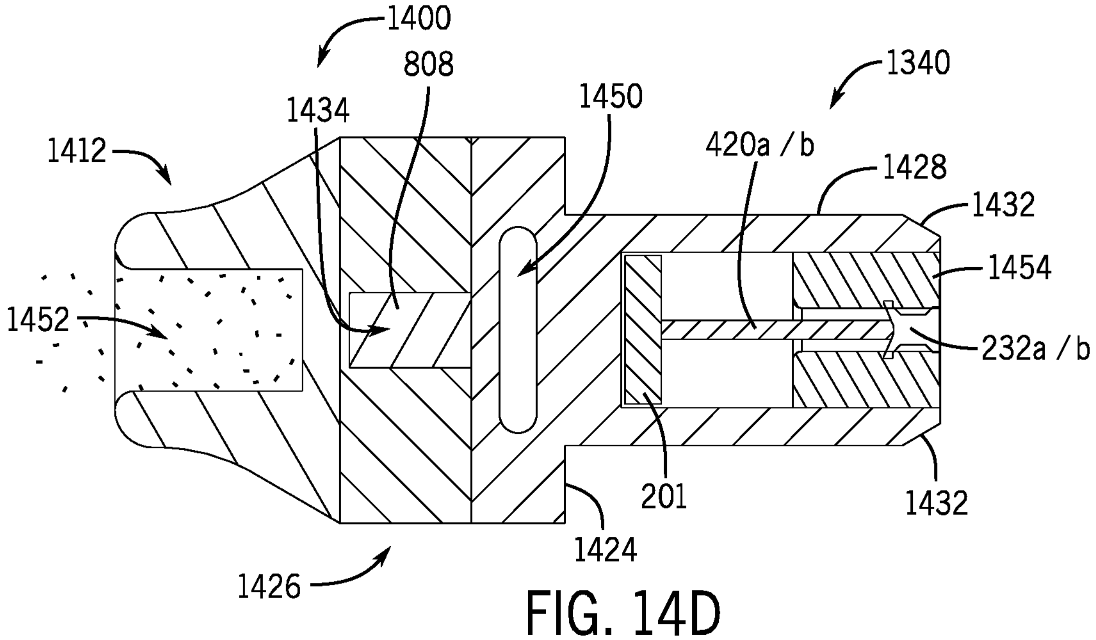
FIG. 14D is a section view of the deployable element of FIG. 14A along section line 14D-14D of FIG. 14A.
Figure 15B:
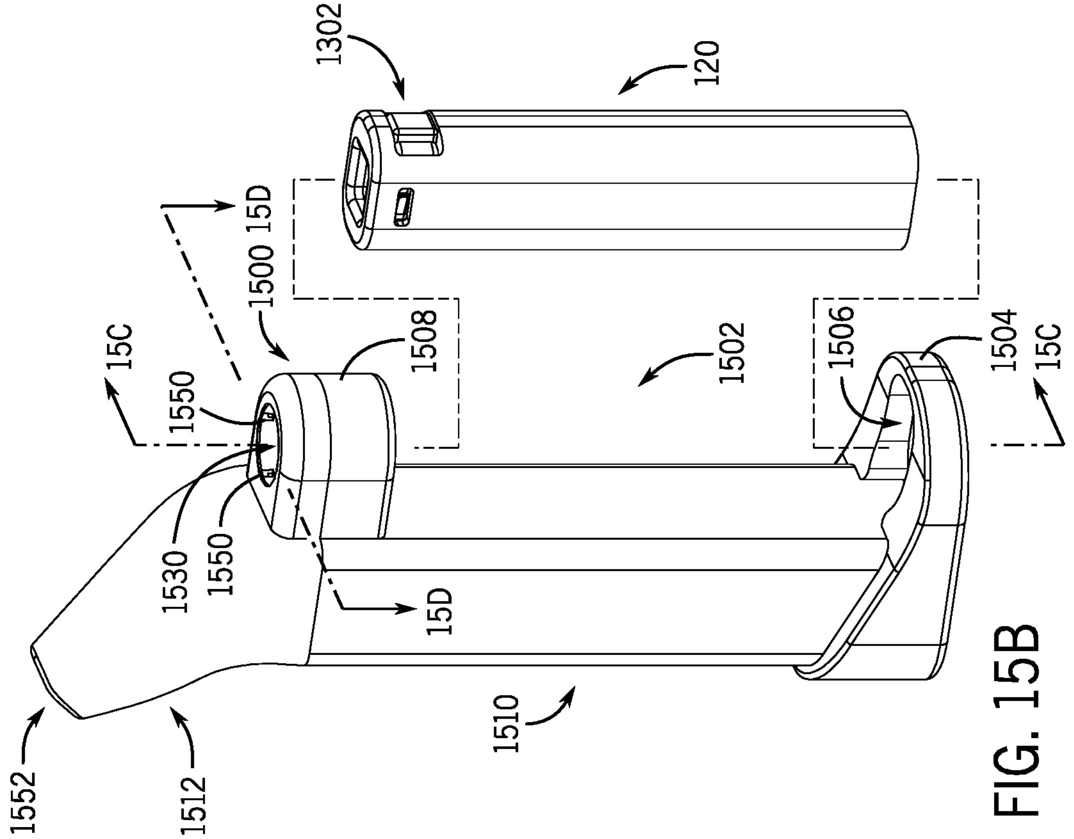
FIG. 15B is a partially exploded view of the smoking apparatus of FIG. 15A.
Figure 15A:
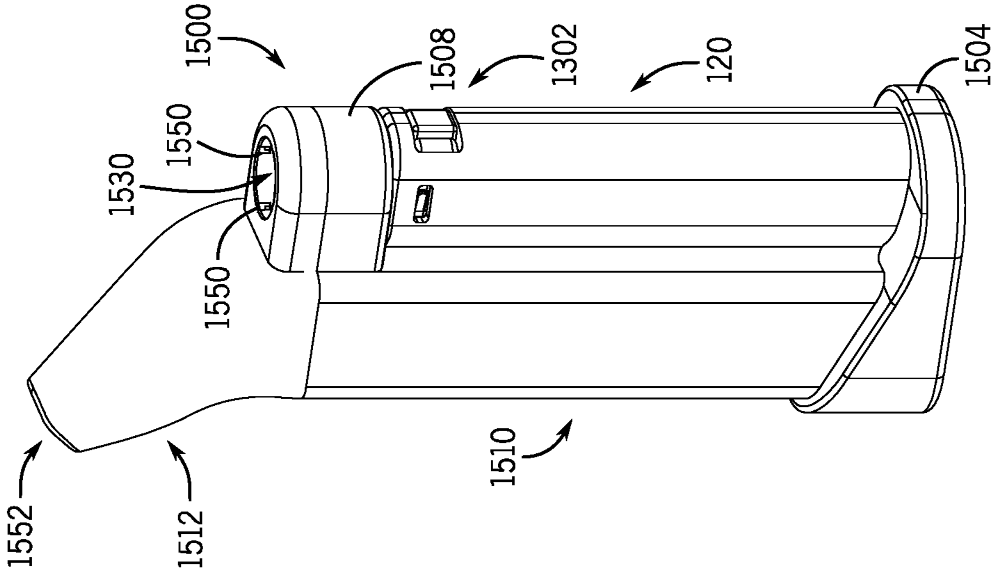
FIG. 15A is an isometric view of a smoking apparatus suitable for use with a heating element system.
Figure 15C:
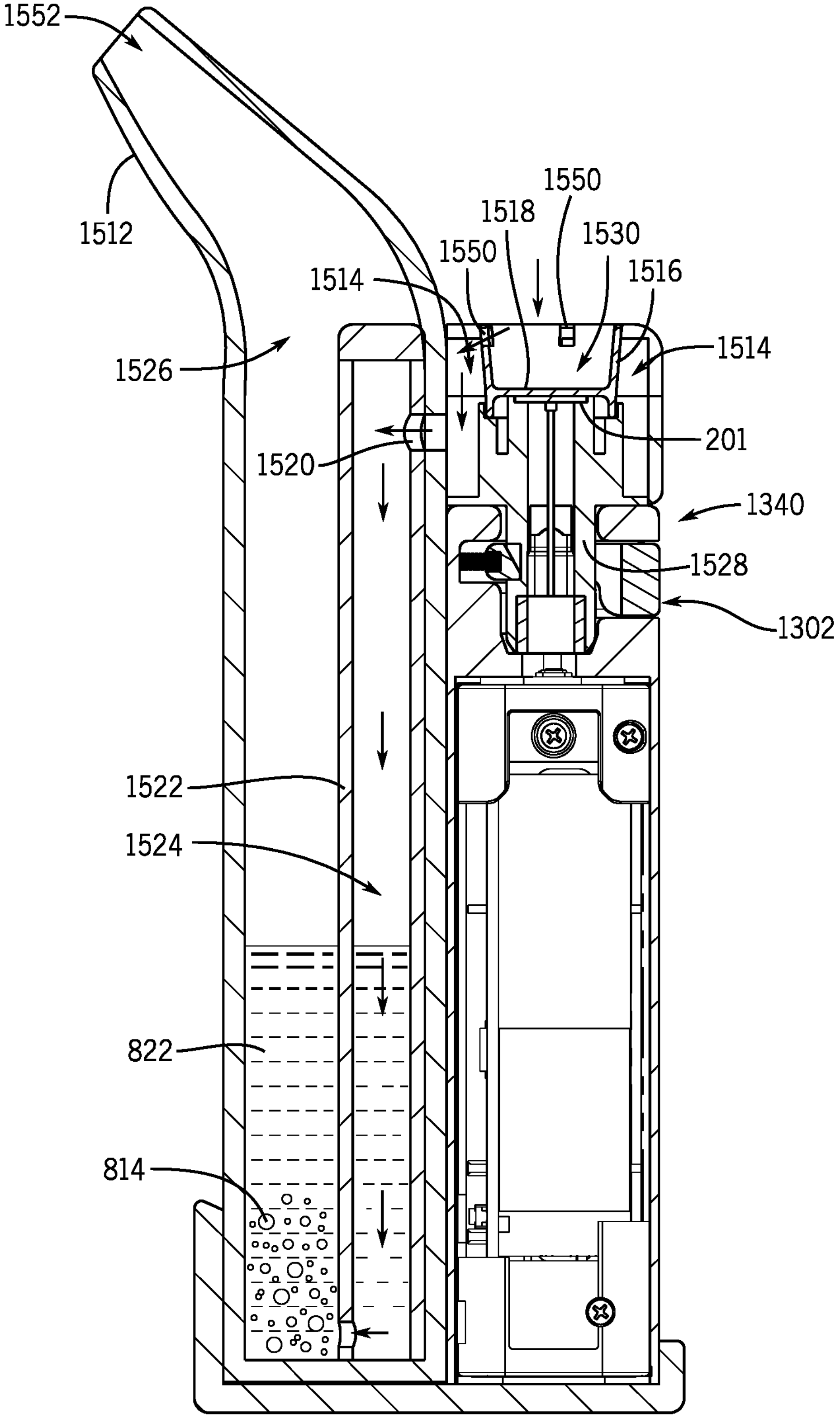
FIG. 15C is a section view of the smoking apparatus and heating element system of FIG. 15A taken along section line 15C-15C of FIG. 15A.
Figure 15D:
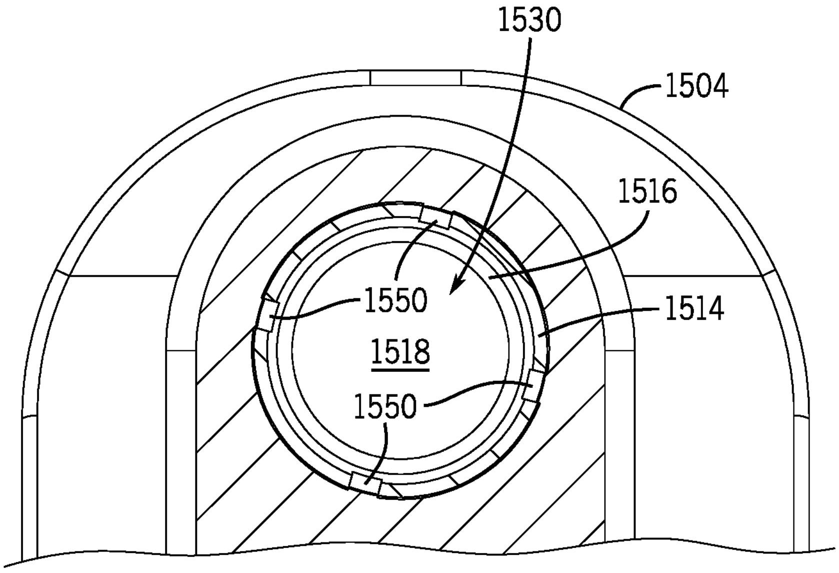
FIG. 15D is a section view of the smoking apparatus and heating element system of FIG. 15A taken along section line 15D-15D of FIG. 15A.

As shown for example, in FIG. 14C and FIG. 14D, the body portion 1428 includes an electrical interface 208 with one or more electrical interface elements 232*a/b* that selectively electrically connect to the power distribution subsystem 406 to supply power to respective electrical conduits 420*a/b* and ultimately to the heating element 201, as previously described. The electrical interface elements 232*a/b* may be secured in the body portion 1428 by a plug 1454. The body portion 1428 may include a chamfer 1432 at a portion thereof to ease insertion of the body portion 1428 into the receptacle 1326. In some embodiments, the heating element 201 may be integrally formed with the body portion 1428 similar to the cover 1301 as previously described.

The deployable element 1400 may include a flange portion 1426 that has a larger diameter than the body portion 1428. Thus, a shoulder 1424 may be formed between the flange portion 1426 and the body portion 1428. The shoulder 1424 may act as a stop or rest for the deployable element 1400 against the casing 108 of the main body 120. The intake 1450 may form a channel or conduit through a portion of the flange portion 1426. For example, as shown in FIG. 14C, the intake 1450 extends through substantially all of the flange portion 1426. In other embodiments, the intake 1450 may extend only partially into the flange portion 1426. The intake 1450 is in fluid connection with a conduit 1458 that leads to an internal compartment 1434 configured to hold a vaporizable material 808. In many embodiments, the vaporizable material 808 may be in a solid or paste form when the heating element 201 is not heated (e.g., when at an ambient temperature), such as to prevent the vaporizable material 808 from leaking from the deployable element 1400 when not in use. For example, the vaporizable material 808 may be a wax or similar substance. The internal compartment 1434 is in fluid communication with the outlet 1452.

The intake 1450 is suitable to draw air therethrough. The deployable element 1400 includes a heating element 201, as previously described, that heats the vaporizable material 808 to convert the vaporizable material 808 to a vaporized material 814. As the air passes from the intake 1450 to the vaporized material 814. The air and the now vaporized material 814 are drawn through the outlet 1452 such as by the inhaled breath of the user. In many embodiments, the deployable element 1400 may be a single use device that is pre-loaded with the vaporizable material 808. In some embodiments, the deployable element 1400 may be refillable with a vaporizable material 808.

With reference to FIG. 15A-FIG. 15D, an example of a smoking apparatus 1500 for use with any heating apparatus disclosed herein is shown. For example, the smoking apparatus 1500 may be suitable for use with the heating apparatus 100 and/or the heating apparatus 113. When used with the smoking apparatus 1500, the deployable element is typically not used. However, in some embodiments, a deployable element may be received in a portion of the smoking apparatus 1500 to provide heat thereto.

The smoking apparatus 1500 includes a body portion 1510 that selectively receives the main body 120 of the heating apparatus, such as to supply power to the smoking apparatus 1500. The body portion 1510 includes a foot portion 1504 and a head portion 1508 that form respective end portions of a receptacle 1502 suitable to selectively receive the main body 120. The foot portion 1504 forms a recess 1506 suitable to receive an end portion of the main body 120. As shown for example in FIG. 15C, the head portion 1508 includes a body portion 1528 with similar features as the body portion 1328 and/or body portion 1428, such as a physical interface 1340, to selectively couple the body portion 1528 to the main body 120 via the retaining mechanism 1302. In other embodiments, the body portion 1528 may include features that enable the body portion 1528 to selectively couple to the retaining mechanism 102 of the heating apparatus 100. The head portion 1508 includes a heating element 201 and other features such as electrical conduits 420*a/b*, the electrical interface 208, the electrical interface elements 232*a/b*, etc. as described herein to enable the main body 120 to provide electrical power to the head portion 1508 and to be selectively removable from the smoking apparatus 1500.

The head portion 1508 includes a compartment 1530 suitable to receive a vaporizable material 808. The compartment 1530 may be formed by a wall 1516 such as a circumferential side wall and a floor 1518. The floor 1518 and the wall 1516 may be joined such that the compartment 1530 is in the shape of a cup or bowl. In some embodiments, the heating element 201 is in physical contact with the floor 1518 such that heat from the heating element 201 conducts through the floor 1518 and/or wall 1516 to heat a vaporizable material 808. In some embodiments, the floor 1518 and/or wall 1516 includes an integral heating feature similar to the cover 1301, as previously described. One or more intakes 1550 suitable to draw air therethrough, such as by the inhaled breath of a user, are formed in the wall 1516. In some embodiments, one or more intakes may be formed in the head portion 1508 of the smoking apparatus 1500. The head portion 1508 may include a plenum 1514 in fluid communication with the one or more intakes 1550. The plenum 1514 may surround substantially all, or a portion of the compartment 1530. The plenum 1514 may be in fluid communication with a conduit 1524 formed by one or more walls 1522 of the body portion 1510. For example, the conduit 1524 may be formed by an outer wall and one or more inner walls 1522 of the body portion 1510. Similarly, an outlet plenum 1526 may be formed by an outer wall and one or more inner walls 1522. The smoking apparatus 1500 includes a mouthpiece 1512 with an outlet 1552 from the outlet plenum 1526 formed therein. The outlet plenum 1526 and/or the conduit 1524 may be configured to receive a liquid 822 such as water. The intakes 1550, the conduit 1520, the conduit 1524, the outlet plenum 1526, and the outlet 1552 may all be in fluid communication with one another. Thus, for example, a user may activate a heating function of the main body 120 to vaporize the vaporizable material 808 into a vaporized material 814 via heating of the heating element 201. The user may inhale air via the mouthpiece 1512 and the outlet 1552. Air may entrain the vaporized material 814 and the air/vaporized material 814 mixture may be drawn through the intakes 1550, to the plenum 1514, the conduit 1520, the conduit 1524, and the outlet plenum 1526 to the outlet 1552 to be inhaled by the user. The vaporized material 814 may be filtered, flavored, and/or cooled by the liquid 822, if used. An advantage of the smoking apparatus 1500 may be the ability to use the main body 120 for a variety of vaporizing applications, using the same main body 120 with various deployable elements and/or the smoking apparatus 1500 without the need to obtain multiple main bodies 120.

Figure 16A:
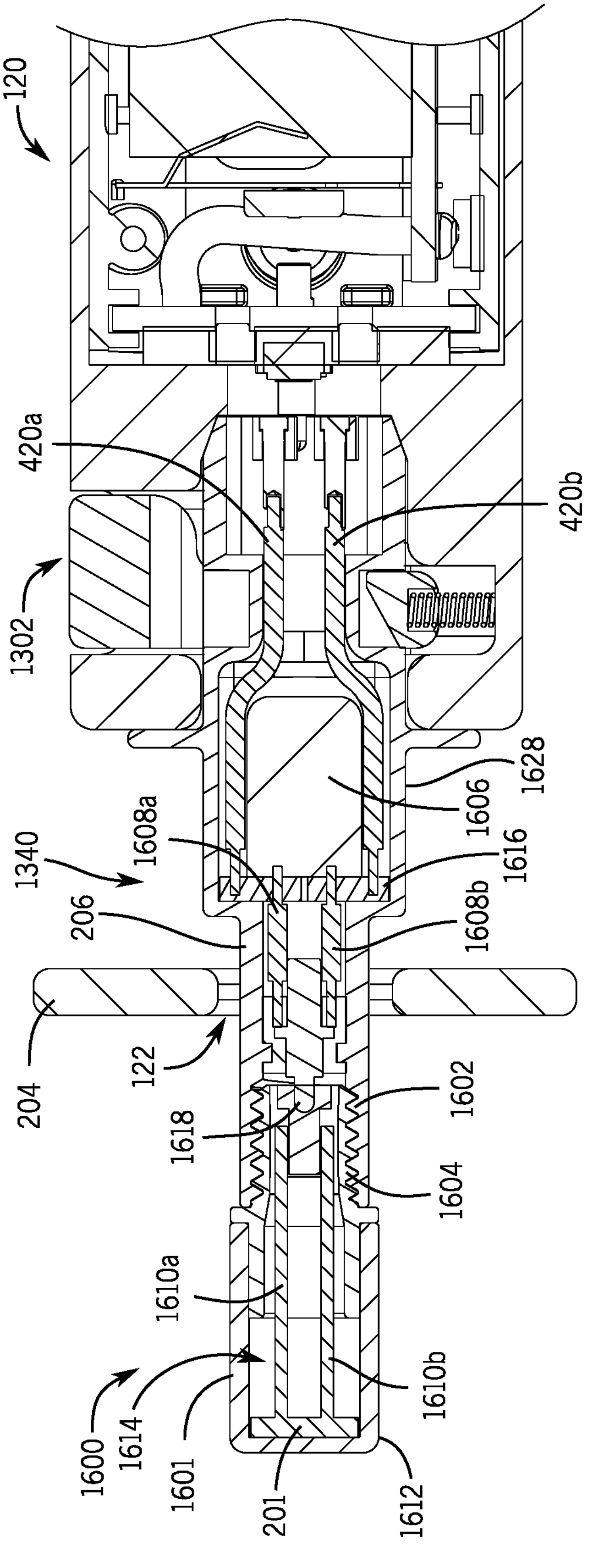
FIG. 16A is a partial section view of an embodiment of a heating element system.
Figure 16B:
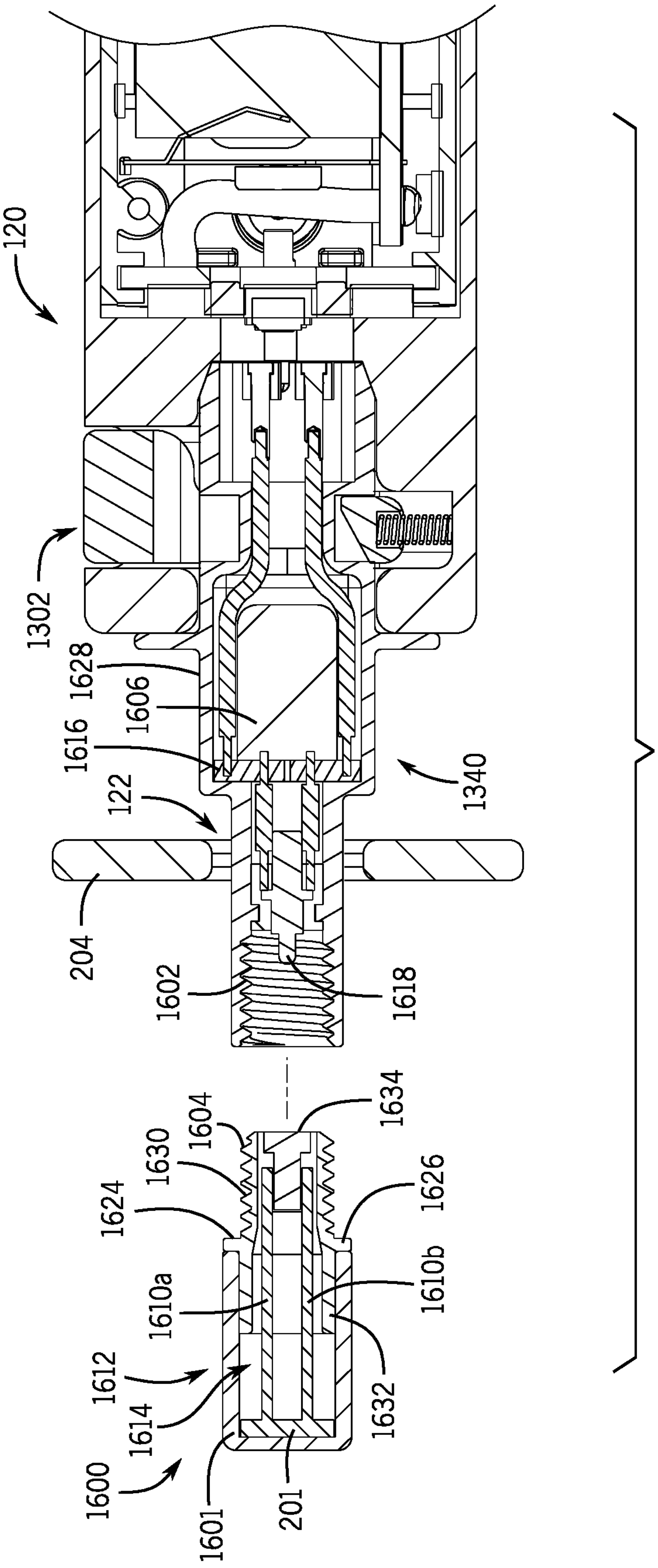
FIG. 16B is a partially exploded view of the heating element system of FIG. 16A.

FIG. 16A and FIG. 16B show an example of a deployable element 1600 suitable for use with a heating apparatus as disclosed herein. For example, the deployable element 1600 may be suitable for use with the heating apparatus 100 and/or the heating apparatus 113. For example, the deployable element 1600 may include features suitable for use with the retaining mechanism 1302 or the retaining mechanism 102, as previously discussed. The deployable element 1600 may include a cover 204 that forms a clearance 122 with respect to the shaft 206. The deployable element 1600 may include additional features such as a removable element 1612 and/or energy storage element 1606.

The removable element 1612 may include a portion of the shaft 206 including the cap 1601 and/or heating element 201. The cap 1601 may have an integral heating feature similar to the cover 1301, as previously discussed. The removable element 1612 may include an insert element 1630 at least partially received in the cap 1601. For example, the insert element 1630 may include a collar 1632 receivable within an internal compartment 1614 of the cap 1601. The insert element 1630 may have a flange 1626 with a diameter larger than the internal compartment 1614 of the cap 1601. The cap 1602 may have a shoulder 1624 that interfaces with the flange 1626 to limit the insertion of the insert element 1630 into the internal compartment 1614 of the cap 1601. One or more electrical conduits 1610*a/b* may be received in the internal compartment 1614 and suitable to provide electrical power to the heating element 201 or the cap 1601. One or more conductors 1634 may be in electrical communication with the electrical conduits 1610*a/b*. In some embodiments, one of the electrical conduits 1610 may be in electrical contact with the cap 1601. The one or more conductors 1634 may make electrical contact with an electrical interface element 1618 similar to an electrical interface element 232, or similar elements of an electrical interface 208 as previously described.

The insert element 1630 may include external threads 1604 or a similar attachment structure (e.g., bayoneted mount) to enable the selective removal of the removable element 1612 from the shaft 206. The shaft 206 may have internal threads 1602 formed on a portion thereof and suitable to engage the external threads 1604 of the removable element 1612. In other examples, the threads of the removable element 1612 may be internal threads and the threads of the shaft 206 may be complementary external threads. In some embodiments, the external threads 1604 and the internal threads 1602 may enable electrical communication between the insert element 1630 and the shaft 206. Some advantages of the removable element 1612 may be the ability to replace a worn, burned out, or inoperative heating element 201 or cap 1601 without replacing the entire deployable element 1600. In other examples, heating elements with more or less heating power may be substituted by removing the removable element 1612 and replacing it with another removable element 1612.

The body portion 1628 may include an energy storage element 1606 disposed therein. The energy storage element 1606 is configured to receive electrical charge from the power supply 402 and supply the electrical charge to the heating element 201 when the deployable element 1600 is in the deployed configuration, disconnected from the main body 120. The energy storage element 1606 may also supply power to the heating element 201 when the energy storage element 1606 is un-deployed and electrically connected to the heating element 201. The energy storage element 1606 may receive electrical charge from the power supply 402 via the electrical conduits 420*a/b*. The electrical conduits 420*a* may provide power to a power distribution element 1616 electrically coupled to the energy storage element 1606. The power distribution element 1616 may be a conductor such as a plate or wire or may be a circuit board with one or more conductive traces thereupon. The energy storage element 1606 may supply electrical charge to the heating element 201 via one or more electrical conduit 1608*a/b* which may be electrically coupled to the power distribution element 1616 as well as the energy storage element 1606. Electrical power may flow from the power supply 402 to the heating element 201 or cap 1601 via the power distribution subsystem 406, electrical conduits 420*a/b*, the power distribution element 1616, electrical conduits 1608*a/b*, the electrical interface element 1618, the conductor 1634, the electrical conduits 1610*a/b*, and/or a portion of the shaft 206 or insert element 1630. The power supply 402 may provide power to both the heating element 201 and the energy storage element 1606 when the deployable element is un-deployed and electrically connected to the main body 120.

In some examples the energy storage element 1606 is a capacitive element (such as an electrolytic capacitor, an electrostatic double-layer capacitor, or an electrochemical pseudocapacitor), a battery, or combinations thereof. As mentioned, above, the energy storage element 1606 may provide electrical power to the heating element 201 and/or cap 1601 for an amount of time after the deployable element 1600 is removed from the main body 120. For example, the energy storage element 1606 may provide power to the heating element 201 or cap 1601 for about 5 to 10 seconds after removal from the main body 120. In one detailed example, the power supply 402 may charge the energy storage element 1606 at a voltage (V) of about 3V and the heating element may have a resistance (R) of about 0.6Ω. By Ohm's law, the power (P) supplied to the heating element in this example is described as $P=V^2/R$ or $(3V)^2/0.6=15$ W of power. The energy capacity and capacitance of the energy storage element 1606 may be calculated as follows. If the energy storage element 1606 is to supply power to the heating element for 5-10 seconds, the energy (E) supplied may be modeled as the power (P) multiplied by the time, or $E=5\ s\times15\ W=75$ Joules for the 5 second case, and $E=10\ s\times15\ W=150$ J for the 10 second case. The capacitance (C) of the energy storage element 1606 (when a capacitive element is used) may be modeled as $C=2E/V^2$. Thus the capacitance of the energy storage element 1606 may be in the range of about $C=2\times75\ J/(3V)^2=16$ Farads to about $C=2\times150\ J/(3V)^2=33$ Farads. This example is by way of illustration only and is by no means limiting. Capacitance or energy storage values of the energy storage element 1606 may be increased from the simple examples calculated here to account for capacity degradation over time, voltage loss as the energy storage element 1606 discharges, different supply voltages, or heating element resistance, etc. Other values may be used in other examples or use cases of energy storage elements 1606 as needed.

The use of an energy storage element 1606 in the deployable element 1600 has many advantages. For example, heating power may be supplied for a longer time to the vaporizable material 808 than with a deployable element that does not include an energy storage element 1606. Additionally, the heat supplied may be at a more stable temperature than when an energy storage element 1606 is not used. Any device disclosed herein may include an energy storage element 1606.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A heating apparatus comprising:
a main body including:
a power supply;
a deployable element selectively coupled to the main body in a first configuration and selectively disconnected from the main body in a deployed configuration, wherein the deployable element includes:
an energy storage element,
a heating element in electrical communication with the energy storage element for providing heat energy,
a physical interface portion selectively engaging the main body,
an electrical interface in electrical communication with the energy storage element and the heating element, wherein in the first configuration the electrical interface is in electrical communication with the power supply to provide electrical power to the heating element; and
wherein, in the deployed configuration, the energy storage element supplies electrical power to the heating element to at least maintain a vaporizing temperature of the heating element for a vaporizable material.

2. The heating apparatus of claim 1, wherein:
the deployable element includes a shaft portion,
the heating element is a resistive element, and
the resistive element is retained in the shaft portion by a plug including a heat barrier that concentrates heat from the resistive element to a focus region.

3. The heating apparatus of claim 1, wherein the main body further includes:
a processing element;
a user input operative to receive a command from a user; and
an indicator operative to indicate a status to the user.

4. The heating apparatus of claim 1, wherein the main body further includes:
a first receptacle operative to:
receive external electrical power from an external power supply; and
provide power to the power supply or the heating element.

5. The heating apparatus of claim 4, wherein the first receptacle is operative to provide power to the power supply and the heating element at least partially contemporaneously.

6. The heating apparatus of claim 1, wherein:
the deployable element further includes:
a shaft portion sized to be received in a container of a smoking apparatus to vaporize a vaporizable material, and
a cover including an aperture, wherein the cover is selectively receivable on the shaft portion through the aperture, and
in the deployed configuration, the cover is positioned over an opening in the container and at least partially forms a seal with the container, wherein the aperture is sized to allow a user to inhale air through the smoking apparatus when the cover seals the container.

7. The heating apparatus of claim 1, wherein the main body of the heating apparatus further includes:
a retaining mechanism to selectively fix the deployable element and the main body together in the first configuration.

8. The heating apparatus of claim 1, wherein the power supply comprises a battery.

9. The heating apparatus of claim 1, wherein the energy storage element comprises a capacitive element.

10. The heating apparatus of claim 1, wherein the deployable element includes an internal compartment configured to receive a vaporizable material.

11. The heating apparatus of claim 1, wherein the deployable element further includes:
a shaft portion, and
a removable portion from the shaft portion including a resistive element for providing the heat energy.

12. The heating apparatus of claim 1, wherein the energy storage element stably maintains the vaporizing temperature of the heating element for an amount of time of at least 5 seconds when the deployable element is in the deployed configuration.

13. The heating apparatus of claim 1, wherein the power supply provides the electrical power to both the energy storage element and the heating element when the deployable element is in the first configuration.

14. The heating apparatus of claim 1, wherein the energy storage element and the heating element simultaneously receive electrical power from the power supply in the first configuration.

15. The heating apparatus of claim 1, wherein the energy storage element provides electrical power to the heating element for an amount of time of at least 5 seconds after the deployable element is removed from the main body in the deployed configuration.

16. The heating apparatus of claim 1, wherein the deployable element further includes:
a resistive element defining a portion of the heating element, and
a cap disposed on a first end of a shaft portion and integrally formed with the resistive element.

17. The heating apparatus of claim 1, wherein the deployable element further includes:
a shaft portion,
a resistive element defining a portion of the heating element, and
a cap disposed on a first end of the shaft portion and enclosing the resistive element.

18. The heating apparatus of claim 7, wherein the main body further comprises:
a carriage body with a rim forming a second aperture in the carriage body;
a pawl extending inwardly from the rim into the second aperture; and
a biasing element that biases the pawl into a latched position with the physical interface to retain the deployable element with the main body in the first configuration.

19. The heating apparatus of claim 1, wherein the main body is movable and sized to be held in a hand of a user.

20. The heating apparatus of claim 1, wherein the heating element includes a resistive element for providing the heat energy.

21. A heating apparatus comprising:
a main body including
a power distribution element;
a deployable element coupled to the main body in a first configuration, the deployable element operably connected with the power distribution element in the first configuration, and selectively disconnected from the main body in a deployed configuration, the deployable element including:

a heating element in electrical communication with the power distribution element in the first configuration, and disconnected from the power distribution element in conjunction with the removal of the deployable element from the main body in the deployed configuration, and an energy storage element, wherein the energy storage element supplies electrical charge to the heating element when the deployable element is in the deployed configuration, wherein, in the deployed configuration, the energy storage element supplies electrical charge to the heating element to generate heat energy to at least maintain or attain a vaporizing temperature sufficient to vaporize a vaporizable material positioned in a container of a smoking apparatus.

22. The heating apparatus of claim 21, wherein:

the main body includes:

a retaining mechanism to selectively interface with the deployable element in the first configuration, or disconnect from the deployable element in the deployed configuration; and the heating element comprises:

a shaft portion;

a cover defining an aperture through which the shaft portion is movably received;

a resistive element for generating the heat energy;

a cap disposed on a first end of the shaft portion and enclosing the resistive element;

a physical interface disposed on a second end of the shaft portion opposite the first end, wherein the physical interface is configured to be selectively retained by the retaining mechanism; and an electrical interface in selective electrical communication with the main body, wherein when the physical interface is retained by the retaining mechanism in the first configuration, the electrical interface is in electrical communication with the main body and operative to receive electrical power from the power distribution element and provide the electrical power to the resistive element.

* * * * *